May 26, 1959  J. WINN  2,888,197
SYSTEMS FOR ORDERING AND ASSEMBLING ARTICLES
Filed Jan. 23, 1953  17 Sheets-Sheet 1
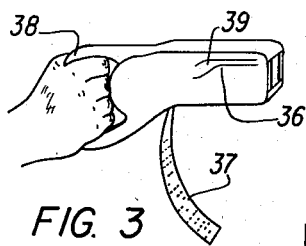
FIG. 3
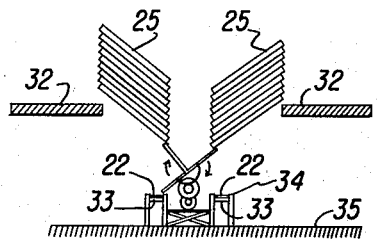
FIG. 2
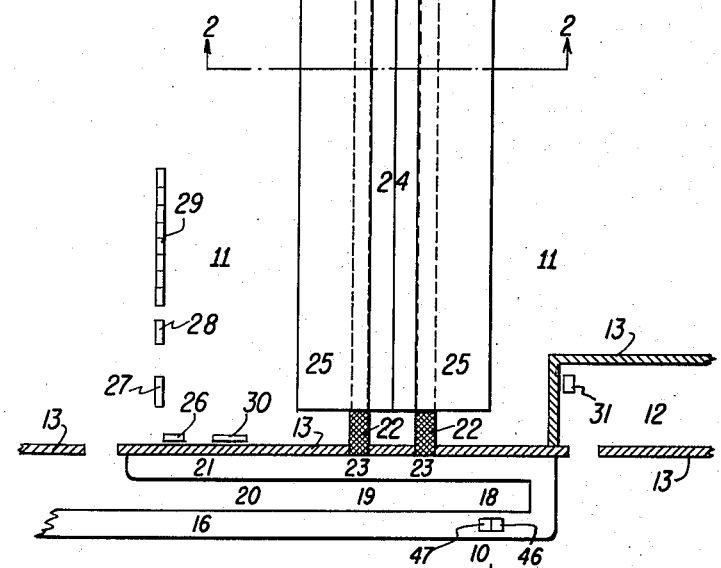
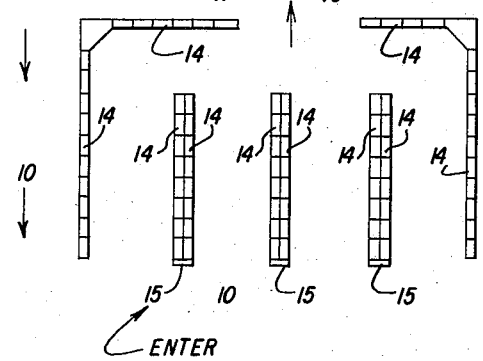
FIG. 1
INVENTOR.
JOHN WINN
BY
Mason, Kolehmainen,
Rathburn & Wyss ATTYS.

May 26, 1959  J. WINN  2,888,197
SYSTEMS FOR ORDERING AND ASSEMBLING ARTICLES
Filed Jan. 23, 1953  17 Sheets-Sheet 2

INVENTOR.
JOHN WINN
BY
*Mason, Kolehmainen,*
*Rathburn & Wyss* ATTYS.

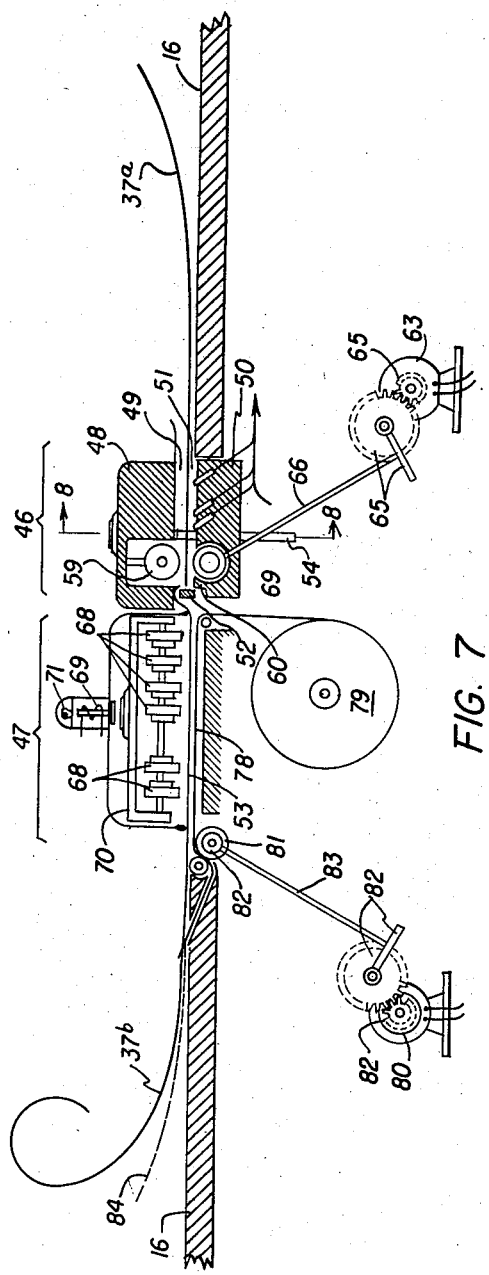
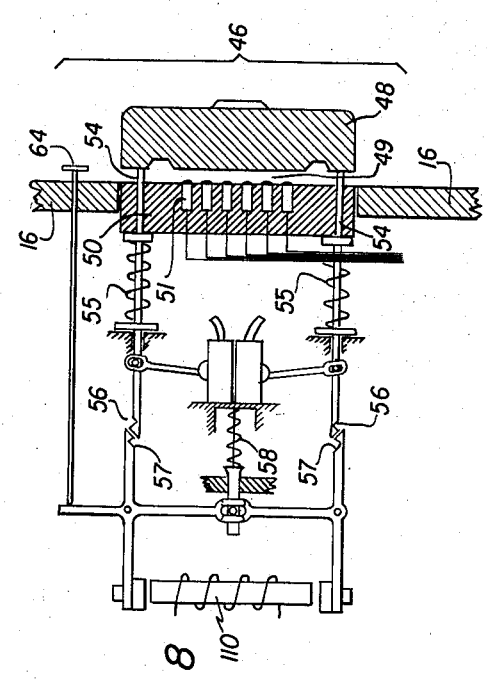

May 26, 1959   J. WINN   2,888,197
SYSTEMS FOR ORDERING AND ASSEMBLING ARTICLES
Filed Jan. 23, 1953   17 Sheets-Sheet 4
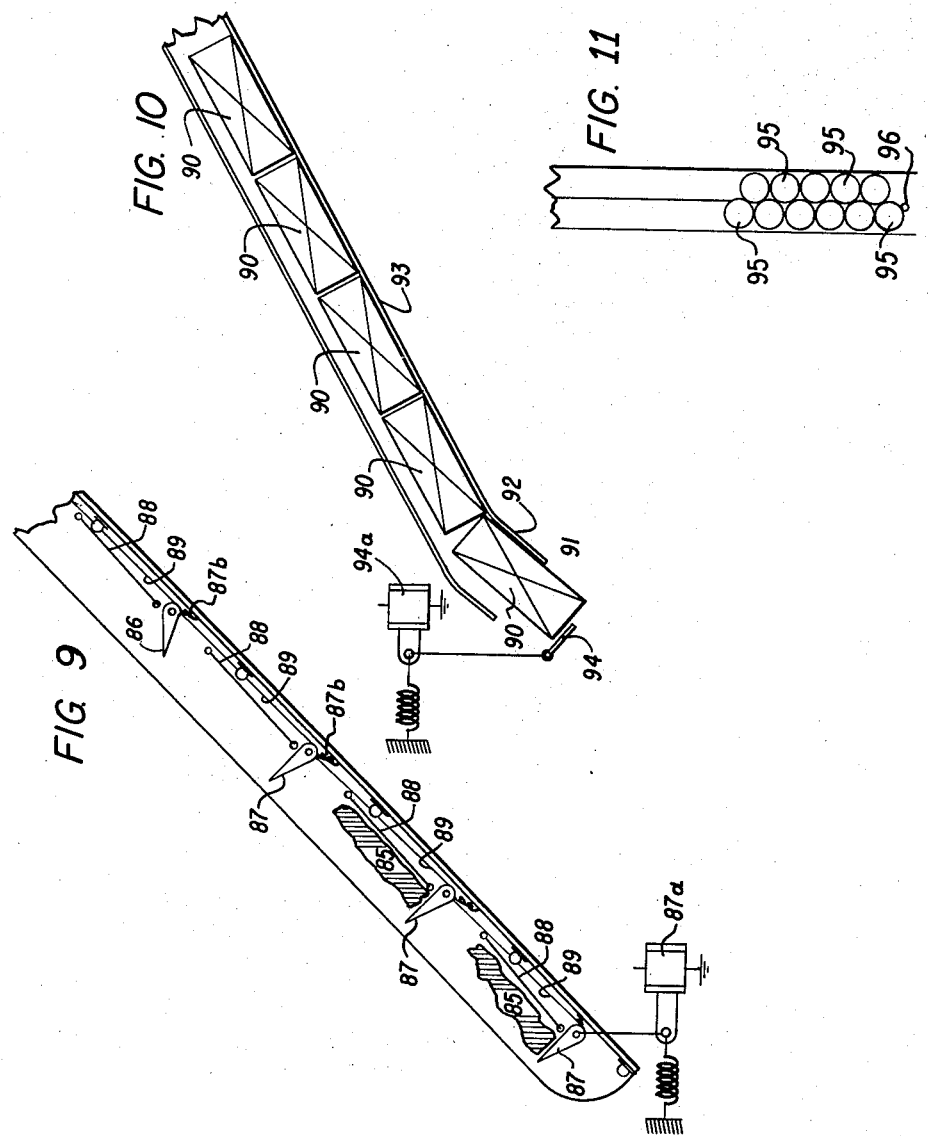
INVENTOR.
JOHN WINN
BY
Mason, Kolehmainen,
Rathburn & Wyss ATTYS.

May 26, 1959 J. WINN 2,888,197
SYSTEMS FOR ORDERING AND ASSEMBLING ARTICLES
Filed Jan. 23, 1953 17 Sheets-Sheet 5

INVENTOR.
JOHN WINN
BY
Mason, Kolehmainen,
Rathburn & Wyss ATTYS.

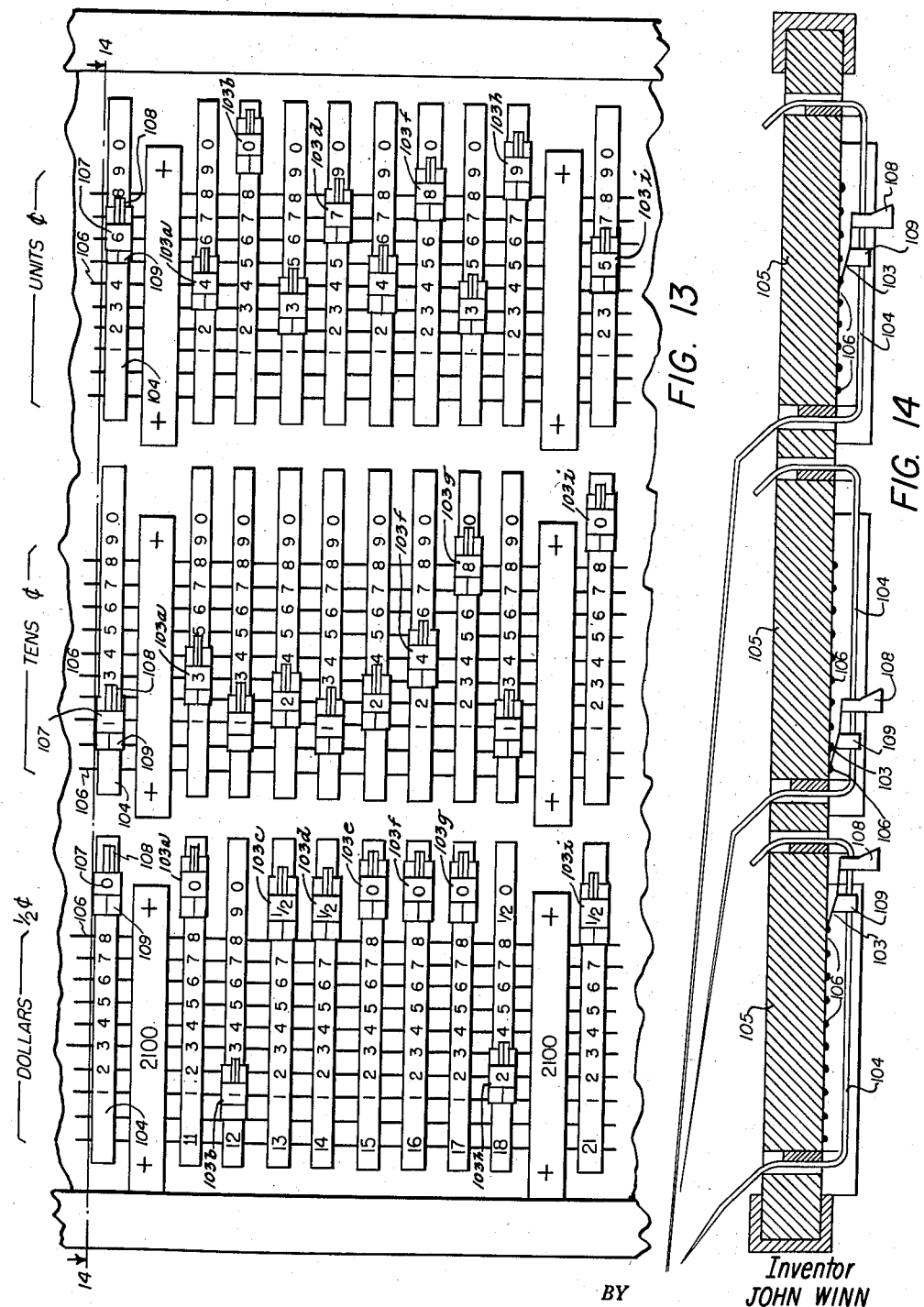

INVENTOR.
JOHN WINN

May 26, 1959
J. WINN
2,888,197
SYSTEMS FOR ORDERING AND ASSEMBLING ARTICLES
Filed Jan. 23, 1953
17 Sheets-Sheet 8
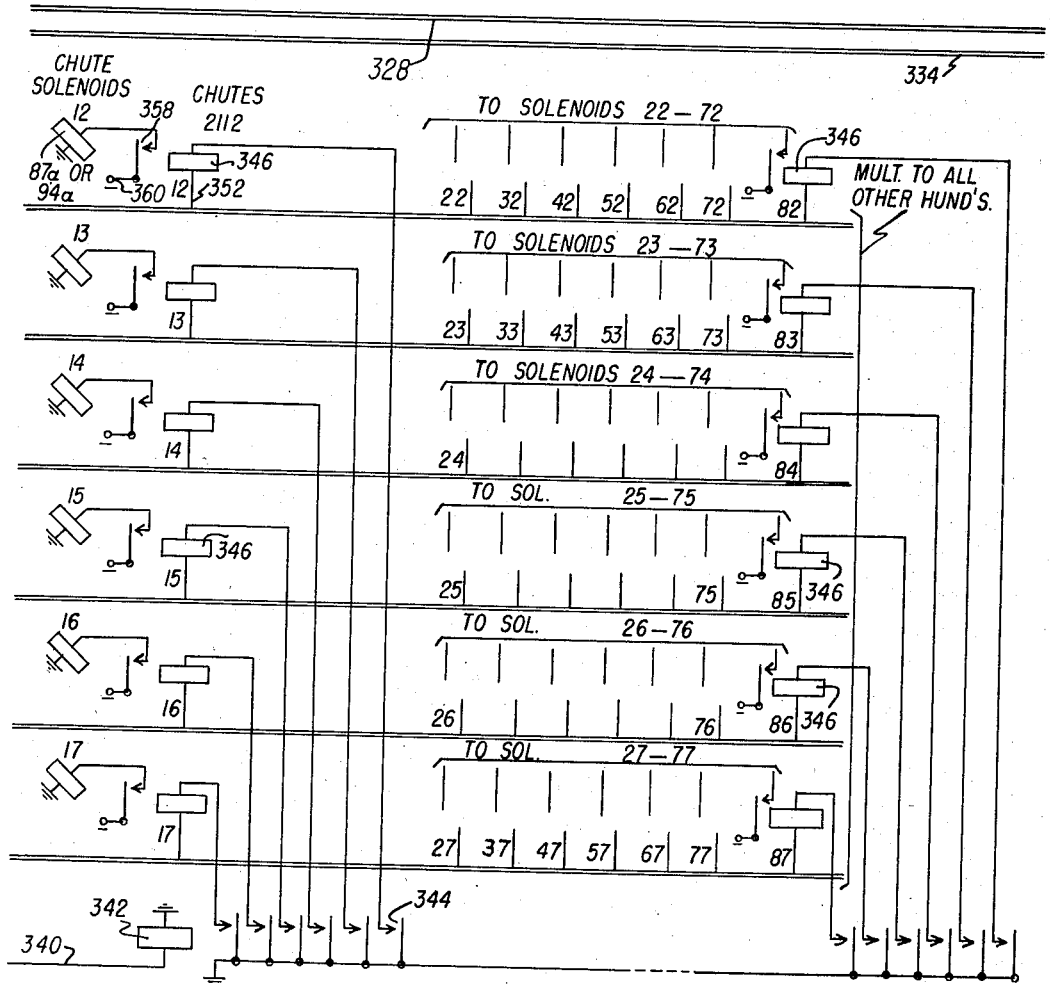
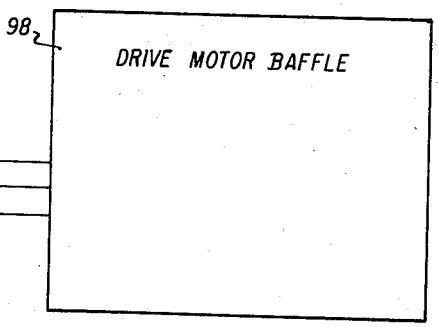
FIG. 25
FIG. 16
| FIG.17 | FIG.18 | FIG.19 | FIG.20 | FIG.21 |
|---|---|---|---|---|
| FIG.22 | FIG.23 | FIG.24 | FIG.25 | FIG.26 |
INVENTOR.
John Winn
BY Mason, Kolehmainen,
Rathburn & Wyss Attys.

May 26, 1959          J. WINN          2,888,197

SYSTEMS FOR ORDERING AND ASSEMBLING ARTICLES

Filed Jan. 23, 1953          17 Sheets-Sheet 13

FIG. 21

INVENTOR.
John Winn
BY
Mason, Kolehmainen,
Rathburn & Wyss Attys.

INVENTOR.
John Winn

INVENTOR.
John Winn

United States Patent Office 2,888,197
Patented May 26, 1959

2,888,197

SYSTEMS FOR ORDERING AND ASSEMBLING ARTICLES

John Winn, Chicago, Ill., assignor to Wynnwood Corp., Winnetka, Ill., a corporation of Illinois Application January 23, 1953, Serial No. 332,868

18 Claims. (Cl. 235—92)

This invention relates to systems for ordering and assembling articles and more particularly to those systems wherein hereterogeneous articles are stocked in chutes or bins and selected and dispensed to a conveyor and thence carried to an assembly location by electrical and mechanical means operated from a remote point by the electrical reading of a specially prepared order list; such reading may be direct electrical control, by electron scanning or by other means. This application is a continuation-in-part of a copending application, now abandoned, of John Winn, Serial No. 119,347, filed October 3, 1949, and entitled "Systems for Ordering and Assembling Articles."

The system of the present invention for shopping, ordering, storing, selecting, pricing, recording and assembling articles comprehends the preparation of a customer's order list by simple mechanical means and the speedy delivery of the articles included on said order list to the customer by mechanical and electrical means with a visual indication as to the number of articles in the order and the total price. More particularly in accordance with the present invention, this order list is fed through apparatus which serves to release the ordered articles from specially designed chutes in juxtaposition to twin conveyor belts for delivery to the customer. Prices of ordered articles are added accumulatively by electrical means simultaneously with the release of each article and when the order is complete, other apparatus prints the item count and dollar totals on the order slip, displays the same information in lights for the customer's information, prints a copy of the price and article totals on a short piece of narrow tape and records the cumulative total on recording equipment in the store manager's office.

One object of this invention is to provide a new and improved dispensing and conveying system.

Another object is to provide such a system which is operated under the control of a medium bearing predetermined permutations of article selection indicia.

Another object is to provide a dispensing and conveying system for simultaneously selecting articles and providing information representative of the price of the selected articles.

Another object is to provide such a system for sequentially selecting dissimilar articles and printing an indication of the total cost of these selected articles.

A still further object is to provide a system for sequentially selecting articles and providing a visible indication of the total cost of the selected articles.

Another object is to provide a dispensing and conveying system for sequentially selecting a combination of articles and providing a visual indication of the number of articles so selected.

A still further object is to provide a dispensing and conveying system which is temporarily rendered inoperative to prevent totaling the cost and number of selected articles which are subsequently cancelled.

Another object is to provide a dispensing and conveying system which is automatically reconditioned upon completion of the series of operations under the control of a first indicia bearing medium for subsequent operation under the control of a second indicia bearing medium.

Another object is to provide a dispensing and conveying system for simultaneously selecting a desired article and providing an indication of the cost thereof and subsequent thereto dispensing the selected articles to one of a plurality of conveying means while producing a visible indication of the cost of the articles.

Another object is to provide new and improved means for translating indicia representative of articles to be selected into indicia representative of the cost of the selected articles.

A still further object is the provision of new and improved means for accumulating and displaying the cost of a predetermined series of articles automatically selected under the control of a series of indicia permutations representative of article selection intelligence.

Another object is to provide a new and improved means for feeding a plural path conveying system from a plurality of article storing means under the control of a single flexible strip having permutations of holes thereon representative of article selection intelligence.

Another object of this invention is the provision of a dispensing and conveying system which simultaneously prints a total of items selected and the cost of these selected items, and concurrently therewith producing a visible indication of such totals.

Further objects of my invention will hereinafter appear from the following description thereof, together with the drawings, which is a preferred embodiment of my invention as applied to a retail food store. In the accompanying drawings:

Fig. 1 is a typical floor plan layout of a store, arranged for this system, showing the customer's area, the stock area, and in outline the approximate relative size of all the important elements;

Fig. 2 is a vertical transverse sectional view taken on line 2—2 of Fig. 1, showing the relative positions of chutes, dual baffle and twin belts;

Fig. 3 is a perspective view of the shopping device with a length of marked tape protruding;

Fig. 7 is a diagrammatic transverse section of an order machine and printer taken along the line of travel of the order list tape;

Fig. 8 is a vertical transverse section taken on line 8—8 of Fig. 7;

Fig. 9 is a sectional view of the unit chute with the nearer chute side not shown;

Figure 12:
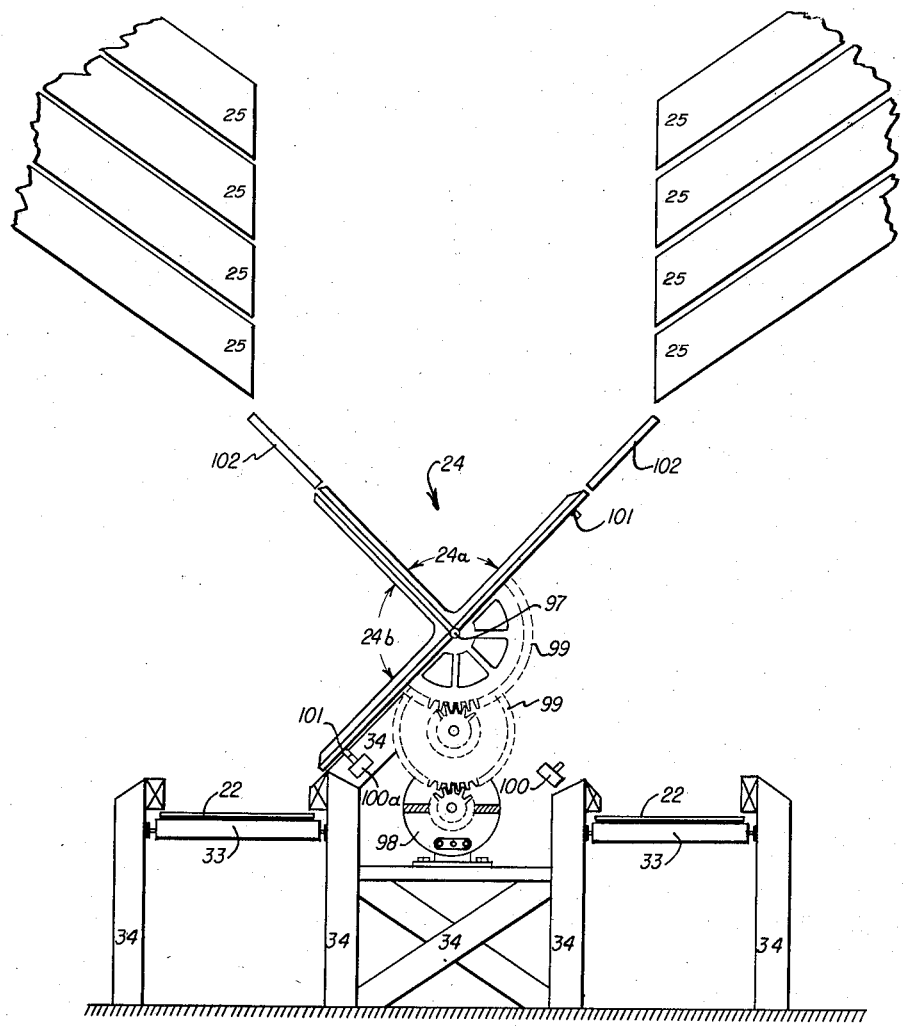
Figure 15:
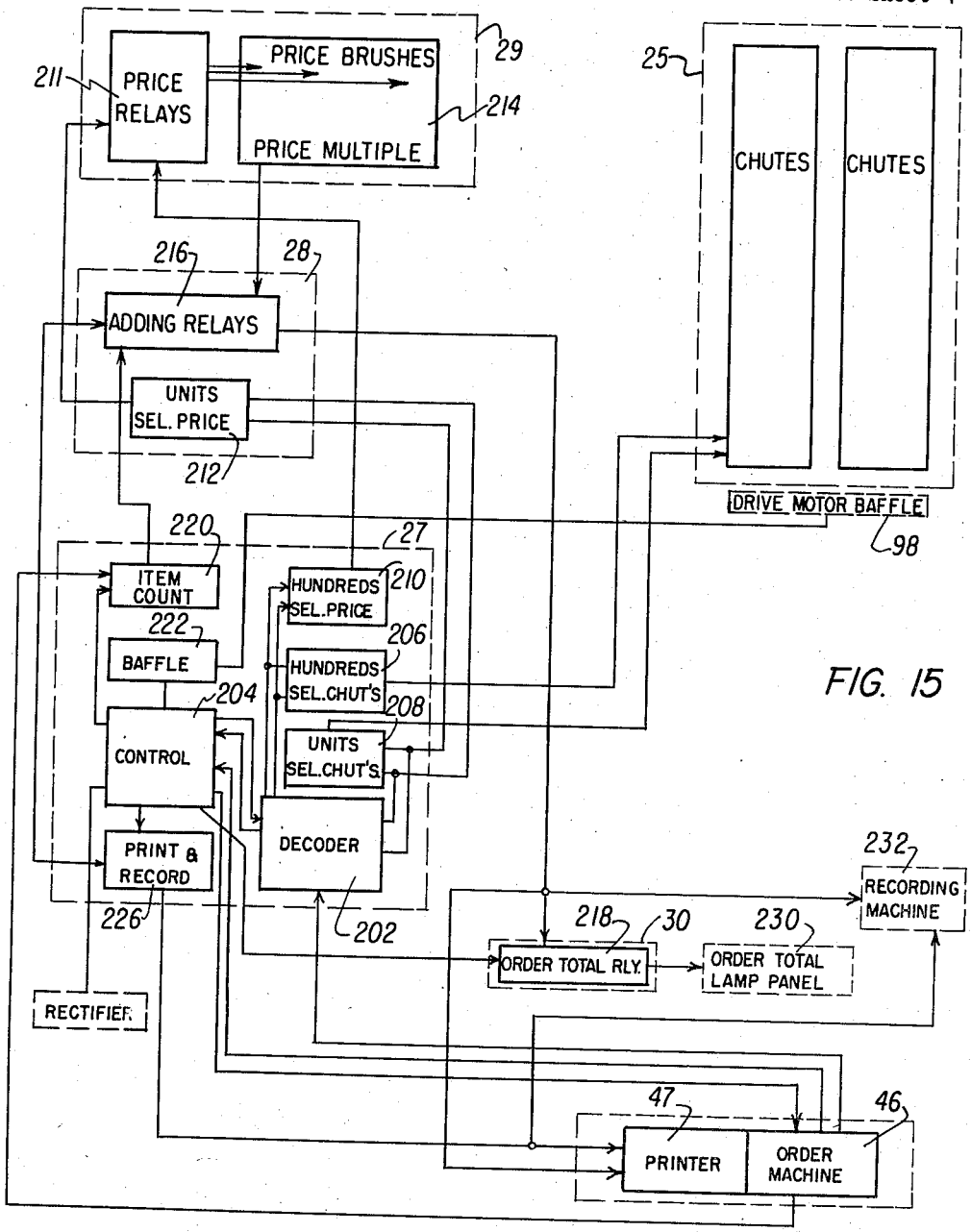

Fig. 10 diagrammatically indicates the characteristics of the single chute;

Fig. 11 is a diagrammatic plan view of a section of the dual chute showing the double row article capacity;

Fig. 12 is a horizontal view in cross section of the dual baffle and the twin conveyor belts with their position relative to chutes indicated;

Fig. 13 is a face view of the price translation brushes and the price multiple;

Fig. 14 is a horizontal transverse section taken on line 14—14 on Fig. 13, showing the brushes mounted and making contact with the price multiple;

Fig. 15 shows in outline diagrammatically the relation between the electrical elements whose approximate locations in a store are shown in Fig. 1;

Fig. 16 is a schematic view of the manner in which Figs. 17 to 26, inclusive, of the drawings are positioned adjacent each other to form a single schematic diagram of the control circuit for operating the dispensing and conveying system of this invention; and Figs. 17 to 26 of the drawings are schematic circuit diagrams of the control system.

The drawings disclose a system arranged for operation as follows:

A customer entering the store finds an unobstructed approach to a display of about 2000 different articles in place as samples on shelves behind glass. Variably mounted in close proximity to each corresponding article is a small fixed receptacle into which a small shopping device called a shopper can be inserted and then withdrawn. The shopper is designed to be carried in the hand and contains a roll of paper tape. Each customer on entering the store picks up a shopper from a convenient rack and when an article which the customer wishes to purchase is located in the display, the shopper is inserted into the contiguous receptacle, with an easy push, and is immediately withdrawn. In this manner the name of the article and its price are printed on the previously blank tape. A plurality of small holes are also simultaneously punched in the tape or printed code representing the selected article imprinted on the tape adjacent to the name and price of the article. The withdrawal of the shopper from the receptacle causes the tape to feed out of the shopper just enough to make the printing visible to the customer and to make a new blank length of tape ready for the marking of the next article chosen by the customer. The customer repeats the operation for each article to be purchased without limit as to the number of items which may be included on a single order list.

When the customer decides that the list has been completed, the shopper is handed to the order clerk who tears off the complete list on a single length of tape. The clerk immediately inserts the list in an order machine, starting it by pressnig down the cover of this machine. All that is visible to the customer is a small housing which is mounted flush on the counter with a small signal lamp on its top. The order list passes automatically through said order machine and when the end of the order list is reached a signal lamp flashes. On a wall behind the counter, and over the packing shelf, there will appear lighted figures which show the amount to be paid in dollars and cents and also the total number of items included. At the same time, these same totals will have been printed automatically on the blank end of the tape before the order clerk removes the tape from the printer which is done as soon as the signal lamp flashes. The order clerk also removes a ribbon copy of these same totals printed on a short piece of narrow tape which is handed to the customer who pays the total to the cashier near by. Stamped "paid," it serves as identification for the order which is usually packed and ready for the customer by the time a convenient delivery desk is reached. The customer gets the complete list with the order. The list names all the articles and their individual prices and gives the total price and number of items. These foregoing steps cover the complete customer shopping operation.

When an order list tape passes through the order machine it is motor driven at a speed which passes three article punched hole combinations per second. These combinations cause article selection and concurrent translation into predetermined price for the particular item and also cause a count to be made of the number of items selected. The selection and price punched hole combinations are made from twelve possible holes which will provide a possible 4056 individual combinations. A thirteenth hole may be used to determine the count. Brush contacts are made through the punched holes as they pass. These contacts result in electrical selection and release of articles from stock. Article prices are added concurrently with selection. A fourteenth brush in the order machine makes a contact as soon as the end of the list is reached and all punched hole combinations have passed the selection brushes. This contact causes the order machine to stop and open and initiates a number of operations including the printing of price and item totals on the order list tape, the display of these same totals in lights, their recording on record equipment in the store manager's office, and conveyance of the selected articles to the assembly location from which they are packed ready for the customer. These electrical operations are regulated and timed by a control circuit consisting of a number of relays only. A fifteenth brush in the order machine is so located that it will make contact through an additional hole made by the manual punching out of the printed price of any item, which is done by the order clerk when a customer wants to cancel some item on the order list. This "punch out" contact causes the article and its price to be skipped entirely and leaves the circuits ready for the next wanted article. Instead of punched hole combinations and protruding brushes making contacts, the code on the tape may consist of printed dots, letters or characters read electronically and adapted to produce similar results.

The stock of articles for selection is in place in gravity chutes of appropriate types above and on opposite sides of a dual baffle which runs from the rear of the stock area forward to a point in the stock area near the order assembly location. As articles are selected they are released by releasers with which all chutes are equipped and fall onto one longitudinal segment of a dual rotatable baffle settling down by easy stages to the bottom. These releasers are actuated by an electrical selection circuit. When the order is complete, the end of an order list having been reached, the baffle dumps to one of two contiguous conveyor belts running parallel with the baffle and below it which convey directly to the assembly location. There the articles are packed for delivery to the customer when the narrow tape marked "paid" is presented.

Addition of prices, concurrent with article selection, results from pulses which reach the relays of an all electric adding machine or operating solenoids mounted over a mechanical adding machine. Prices for articles are predetermined by brushes set at the proper figures. These price brushes, three for each punched hole code, are grouped together on panels in convenient cabinets. The adding device furnishes total readings of prices and also number of articles and, at the end of an order list, these readings determine the setting of the type wheels in the printer associated with the order machine, the order total lamp display, and the record on the recording machine in the store manager's office.

Referring to the drawings, the floor plan layout shown in Fig. 1 is divided into the customer area 10, the stock area 11, and the manager's office 12 separated by partitions 13. Prominent in the customer area 10 are sample article display shelves in cabinets 14. At points convenient from the store entrance are racks 15 to hold supplies of shoppers ready for customer use. A counter 16 furnishes a mounting for the order machine 46 and printer 47. The order clerk stands at location 18 behind the order machine. Location for the cashier 19 and the location for delivery 20 are also along counter 16. There is a packing shelf 21. Ordered articles arrive by either of the two conveyor belts 22 and pass through openings in partition 13 to assembly locations 23. Baffle 24 is above and between belts 22 which extend back along the length of the baffle 24. About one thousand chutes at either side are mounted above baffle 24 in areas 25. Installed in the stock area 11 are: a rectifier 26 which supplies twenty-four volt direct current for all relay, solenoid and lamp operation; a cabinet 27 containing the common frame mounting relays for the control circuit, the decoder, unit and hundreds selection, and the printer, order total lamp, baffle and item count circuits; a cabinet 28 containing the adding device, either all electrical or mechanical; cabinets 29 containing the price translation relays, and the price brush and multiple panels; and, a cabinet 30 containing a frame mounting the order total lamp relays. Installed in the manager's office 12 is the recording machine 31. Mounted on the front side of partition 13 above the assembly locations 23 are two order total display lamp panels, not shown. Also not shown, in the stock area 11 are the belt and baffle drive motors, and the wiring connecting the various items of electrical equipment.

In Fig. 2 the position of the chutes in the chute areas 25 is indicated. They are loaded from loading platforms 32. The chutes in areas 25 drop articles onto baffle 24 (see Fig. 12) which dumps aritcles to belts 22 supported on rollers 33. Rollers 33 and baffle 24 are supported by framework 34 anchored to floor 35.

In Fig. 3 the shopper 36 has a length of marked tape 37 protruding. The hand grip 38 makes shopper 36 easy to carry and insert in receptacles 45. Small rails 39 guide the shopper 36 when it is inserted in a receptacle 45.

Figure 6:
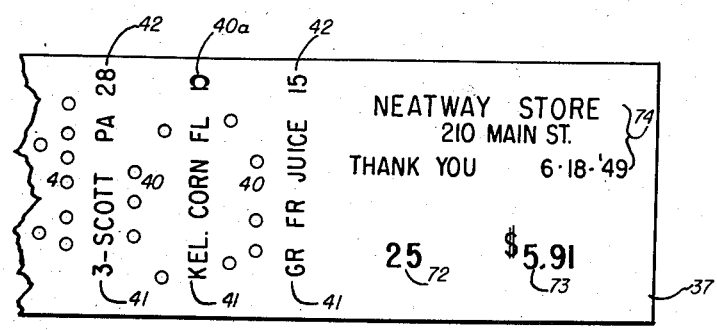
Fig. 6 shows a part of a customer's completed and processed order list tape, showing a perforated code.

In Fig. 6, the punched hole combinations 40, the names 41 of the articles and their prices 42 are all marked on tape 37 when the shopper 36 is inserted in a receptacle 45, one marking at each insertion. If a customer later desires to cancel an order represented by a combination 40, an aperture or hole 40a is cut in the tape 37 to remove the printed price in the printed material representing the article which is to be cancelled.

Figure 4:
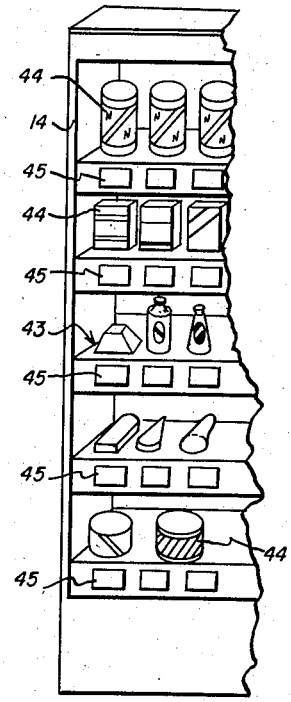
Fig. 4 is a face view of a section of display shelves mounted in convenient cabinet showing the contiguous receptacles for the shopping device below each article.

In Fig. 4 the sample article display shelves 43 are mounted, adjustably as to height, in a cabinet 14. There are no wiring or other connections to cabinets 14 allowing them to be relocated with ease. Articles 44 are displayed on the shelves 43, usually one of each complete description but articles may be mass displayed if desired. Immediately under and contiguous to each article 44 on display is a receptacle 45 which is attached to the under side of shelves 43 making the spacing of the receptacles 45 variably adjustable to conform to the spacing of the displayed articles 44.

The interior of the receptacle 45 does not shown in the drawing as they are normally closed by a free swinging flap which pushes out of the way when a shopper 36 is inserted. In the bottom or far end of the receptacle 45 there is installed a so-called punch plate which determines the punched hole combination 40 which will be marked on a tape 37 when a shopper 36 is inserted. Should it be desired to change the chute location of the delivery stock of an article 44 on display, a different punch plate may be readily substituted. Changing a lineotype slug, also mounted in the receptacle 45, is also a simple matter. The price of displayed articles 44 may be shown by stickers applied to the glass, not shown in the drawings which protects the displayed articles 44 or it may be on the flap of the associated receptacle 45. Means acting jointly in the shopper 36 and the receptacle 45 result in an effective punching force of more than four times the force of the applied manual push on the shopper 36 as it is pushed into the receptacle 45. Various types of mechanical movements may be used in the shopper and receptacle cooperating together for multiplying the external force applied to the shopper in order to reduce the force necessary for easy operation. The shopper 36 and the receptacle 45 are more fully described and also claimed in a copending application of John Winn and Edward S. Peterson, Serial No. 300,082, filed July 21, 1952, and entitled "Punching Devices," now Patent No. 2,736,379.

The customer after completing an order list from the display shown in Fig. 4 using the shopper shown in Fig. 3 to mark the list as shown in Fig. 6 proceeds to the order clerk location 18 in Fig. 1. The order clerk removes the complete order list from the shopper 36 and inserts it in the order machine 46.

In Fig. 7 and Fig. 8, the order machine assembly is indicated as 46 and the printer assembly as 47. The cover 48, or ground plate of the order machine 46, which is the portion appearing above the counter 16, is shown in the open position which leaves a guide space 49 below the cover 48 and above the insulated bed 50 which carries the slightly protruding insulated brushes 51. An unfilled order list tape 37a is shown inserted in space 49 up to the point where it is stopped by barrier 52. The printer 47 also has an open guide space or way 53 and an order list tape 37b, which is assumed to have passed through the order machine 46, is shown as it would be in place before printing. One end of tape 37b is held loosely by barrier 52, which holds the tape 37b in proper longitudinal position to receive printing.

The complete sequence of operations as a tape 37 is caused to advance, from the tape 37a position, through the order machine 46 and the printer 47 is as follows, assuming that the previous tape 37 has been withdrawn from position 37b so that the guide way 53 through the printer 47 is open and cleared.

The order clerk presses vertically downward on the raised portion in the center of the order machine cover 48 which is supported by two shafts 54. These shafts 54 have sleeve guides which permit only up and down motion of the shafts 54. The springs 55 tend to return shafts 54 and cover 48 to the open position and hold them there. The bottom ends of shafts 54 terminate in latches 56. The order clerk's downward push overcomes springs 55 and cover 48, shafts 54, and latches 56 move down until they are engaged by catches 57 which are pushed inward and held engaged by spring 58. The downward movement of cover 48 carries with it idler roller 59 until it bears, with the tape 37 between, on drive roller 60. The barrier 52 is carried down into a recess and a space between 52 and the bottom of cover 48 will permit passage of tape 37 when it is driven forward by the rollers. The downward movement of shafts 54 operates two micro switches 61 and 62 which are mechanically linked to shafts 54. Switch 62 is snapped "on" which starts the order machine drive motor 63. The drive motor 63 drives drive roller 60 through gears 65 and shaft 66 connections. The rotation of drive roller 60 pulls the tape 37 through order machine 46 and pushes it through printer 47. The tape 37 advances at the rate of about two inches per second which passes three punched hole combinations 40 per second over brushes 51 which, with cover 48 in the closed or down position, will make contact with the under side of cover 48 whenever a punched hole passes over a brush 51. There are fifteen brushes 51 in all. Twelve are for article selection and are connected by wires to the decoder in the selection circuit. One brush 51 is for item count and is connected to the item count relay. Another brush 51 is for "punch out," as described and the fifteenth brush 51 is connected to the control circuit. This last brush 51 makes contact when the end of the list has passed it. The cover or ground plate 48 is connected to ground by the control circuit. The brushes 51 are equally spaced from each other and are arranged in three parallel rows which are offset laterally from each other so that each row of brushes 51 only engages the ground plate 48 through similarly displaced openings or perforations in the tap 37. The third row of brushes 51 which includes only the "punch out" brush 51 and the "end-of-list" brush 51 is displaced longitudinally from the other two closely spaced rows.

Drive of the tape 37 continues until the end of tape 37 has passed just beyond rollers 59 and 60. This allows contact between two brushes 812 and 814 (Fig. 17) to close the operating circuit of electromagnet 110 (Figs. 8 and 17), the operation of which releases catches 57 and cover 48 springs open under the influence of springs 55. The upward motion of shaft 54 snaps switch 62 to the "off" position and stops drive motor 63. The end of the tape will have passed the end-of-list brush 51 before this and in time for its contact and connection through the control circuit to have caused removal of current from all the other brushes 51 before the end of the tape 37 will have gotten as far as the other brushes 51. The cover 48 can be released at any time if desired and the drive motor 63 stopped by the operation of manual release button 64.

When the end-of-list brush 51 makes contact it also starts the printing cycle through the control and print and record circuits. The tape 37 now indicated at 37b is ready for printing. The first step in the printing cycle is for the type wheels 68 to take their setting to correspond with the adding machine totals and this will take place soon after the end-of-list brush 51 makes contact. As soon as setting is complete printing will take place provided switch 61 is closed. This switch 61 is closed when cover 48 is open and open when cover 48 is closed. This switch 61 is in the print circuit as a safeguard against the possibility of printing before the tape 37 has come to rest in printing position. Printing is effected by a downward blow from solenoid 69 applied to chassis 70 which mounts type wheels 68. After printing, the type wheels 68 are restored to normal by the print and record circuit as the final step in its cycle. Coincident with printing, light 71 flashes as a signal that tape 37 may be removed. Fig. 6 shows how the printing appears on tape 37. Item total 72 and price total 73 are printed from type wheels 68. Store identification and date 74 are printed from block type (not shown) also mounted in chassis 70. Also at the moment of printing, the order totals, items 75 and price 76, appear in lights on the order total panel 77 which is in view of the customer on the wall of partition 13 above the belt opening to the article assembly location 23. These lights are so timed by the order total lamp circuit that they remain lighted until the entire order has been delivered at the assembly location 23 which is an aid to the packing clerk. The display of the number of items 75 aids the packing clerk to preselect a bag or carton of the proper size to pack the coming order.

An essential part of the printing operation is a broad type ink-ribbon (not shown) which is fed from a reel over a roller and between tape 37 and type wheels 68 and block type. Returning over another roller, the ribbon passes beneath tape 37 and over a narrow tape 78 on which a ribbon copy is made of item and dollar totals when the printer prints. This narrow tape 78 is fed from a mounted roll of blank tape 79 and is pulled from the roll 79 and forced out, after receiving its impression, by narrow tape drive motor 80 connected with drive roller 81 by gears 82 and shaft 83. Feed is under control of the print and record circuit and after printing causes the ejection of sufficient length of narrow tape 78 to dotted position 84 to expose the printing and allow removal of a length of the narrow tape 78 which is given to the customer to indicate the amount to be paid to the cashier, to show a record of payment, and to identify the goods when the order is claimed by the customer. The order list tape 37 goes from the order clerk to the packing clerk and is included by him with the packed order. The type ribbon feed is from impulses received from the print and record circuit and there is automatic ribbon feed reversal by conventional means. The print and record circuit also causes the item and the price totals to be recorded on the listing and adding recording machine 31 in the manager's office for purposes of record and administration.

Figs. 9, 10, and 11 indicate the nature of the preferred chutes for use with this system. Fig. 9 is a diagrammatic sectional view of the unit chute for soft or irregularly shaped articles. Articles 85, when introduced at the top of a unit chute in the filling operation, slide over unlatched gates 86 until they come to rest on a bed 88 behind a latched gate 87. When an article 85 comes to rest the gate 87 next above the article 85 will close and latch automatically thus keeping each article 85 separated from following articles 85. When the releaser activating means 87a releases the lowest gate 87 the article 85, behind the gate 87 slides down and out and the gate 87 swings back to the closed and latched position under the influence of a restoral spring 87b. A slight overswing caused by the momentum of the gate 87 acts through the medium of a tie rod 89 to unlatch the gate 87 next above and article 85 slides down and takes the place of the previously released article 85. The return of the second gate 87 similarly releases the next higher gate 87 and if an article 85 is behind the gate 87 the article 85 will advance to the bed 88 formerly occupied by the second article 85. This operation is repeated automatically each time an article 85 is released from the bottom of the chute so there will always be an article 85 ready for delivery as long as one or more are in the chute. It is seen that articles 85 do not come in contact with each other but are handled as a unit. There will always be a latched gate above each article 85 and gates above that will always be unlatched ready to pass articles 85 when the chute is refilled. This chute structure is more fully described and also claimed in a copending application of John Winn, Serial No. 294,252, filed June 18, 1952, and entitled "Unit Dispensing Devices," now Patent No. 2,743,820.

These unit chutes may be grouped in multiples and tripped in rotation by a single electrical element which rotates a tripping shaft arranged to trip a multiplicity of chutes in rotation. It may be desired to do this to assure delivery of a succession of similar articles at high speed or to increase chute storage capacity for a given article. These chutes are normally mounted inclined at an angle of approximately 45 degrees, more or less depending on the characteristics of the articles to be handled therein. In the case of articles which tend to adhere to the bed of the chute or otherwise offer unusual resistance to sliding, chutes may be mounted vertically in order to insure positive functioning.

Fig. 10 is a diagrammatic section of a single chute for rectangular articles 90. It will also handle long cylindrical articles. The combination of the overhang at 91 of the lowest article 90 and the two slopes 92 and 93 of the chute result in sufficient interval after an article 90 is released by a chute solenoid 94a for the spring returned releasing gate 94 to have reclosed and latched before the following article 90 strikes the gate 94. This type of chute may also be grouped and used in multiples as described above for the unit chute.

Fig. 11 is a diagrammatic view looking down at right angles to the length of the dual chute for cylindrical and near cylindrical articles 95. The chute is adjustable to a width a little less than twice the diameter of the articles 95 to be handled by it. This results in an interlock of the contained articles 95 so that restraining the bottom article 95 as indicated at point 96 holds both rows of articles. The overhang of the lowest article 95 is a factor in high delivery speed which this chute furnishes. All three types of chute have the common characteristic that release of articles therefrom is by trigger action which permits the use of the small direct current electromagnets or solenoids 87a or 94a to control release.

In Fig. 12 the dual baffle and belt assembly is shown in more detail than in Fig. 2. The conveyor belts 22 are supported on rollers 33 mounted on the framework 34. This framework also supports the baffle 24 which revolves about the axis of shaft 97 which is mounted in bearings (not shown). The baffle 24 can revolve clockwise in a 90 degree arc from the position shown, with baffle 24a in place to receive an order, to a position which dumps baffle segment 24a and brings baffle segment 24b into position to receive an order. The baffle 24 can then revolve counterclockwise to dump baffle segment 24b onto the other conveyor belt and bring baffle segment 24a back into the receiving position. The baffle is rotated by a reversible drive motor 98 through gears 99. The drive motor 98 is stopped when one of the two lugs 101 operates one of the two switches 100 or 100a. The position of chutes 25 in relation to the baffle is indicated. Fixed baffles 102 are used as may be necessary so that articles falling released from chutes 25 will first strike a baffle 102 or high on the baffle segment 24 side and not fall directly on articles already in the trough of the baffle segment 24. In actual operation, all the articles of an order list are retained in the baffle trough, which is up, until the end of the list is reached when the baffle circuit causes the start of the drive motor 98. In about one second the other baffle trough is ready to receive the articles of the following order. This is less time than it requires the order clerk to remove the first order list from the printer 47 to insert a second oder list into the oder machine 46 and to start it by pushing down its cover 48. Hence there is no delay between orders as is necessary in a system using an ordinary baffle and a single belt. In this improved dual system after one order has been dumped on one belt there is available time for belt clearance while a second order is accumulating in the baffle trough, plus one second while the second order is dumped to the second belt, plus the time it takes to accumulate the third order which will be dumped on the first belt. Even in the case of very small orders this still adds up to sufficient time for clearance at moderate belt speed. This slower belt speed minimizes possible damage to articles being conveyed to the assembly point. As all articles of an order in the baffle trough are dumped on a belt at the same time, this permits the predetermination of the delivery order of arrival of the articles at the assembly point regardless of the sequence of the articles on the customer's order list avoiding heavy hard articles crushing light soft ones by the assignment of the articles to the chutes. A modification of the dual baffle as described is provided to insure positive action in the dumping of articles offering high resistance to sliding on a 45 degree slope. The baffle and the circuit for controlling the baffle alternately to discharge the selected articles thereon is more fully described and also claimed in a copending application of John Winn, Serial No. 145,255, filed February 20, 1950 and entitled "Transfer and Conveying Devices," now Patent No. 2,742,133.

In the electrical selection of articles the first steps after the brush 51 contacts in the order machine 46 is the decoder which consists of a group of relays which decode the punched hole combinations of the four sets of three holes each, there being twelve selector brushes 51 in all. There are eight possible combinations of three holes, so they may be decoded into the digits one to eight, inclusive, for thousands, hundreds, tens and units, that is into four digit numerical codes. The first two digits cause the hundreds selection relays to pick the proper hundred and the next two digits cause the units selection relays to pick the proper ten and unit within the hundred. The control circuit controls and times the selection. However, as shown in Figs. 17 to 26, inclusive, of the drawings, only the digits two to seven, inclusive, in the units and thousands denominational column of the numerical designation for the articles are utilized. Obviously, varying numbers of perforations and brushes 51 may be utilized to produce a greater or smaller number of numerical codes or article designations available in accordance with the number of articles to be dispensed. The use of the digits one to eight, inclusive, in the hundreds and tens denominational column and the digits two to seven, inclusive, in the thousands and units denominational columns makes possible a total of 2304 different numerical codes or article designation.

These same four digit numerical codes or article designations are translated into prices as determined by the setting of manually moved brushes 103 shown in Fig. 14. These brushes 103, three for each code or article, slide on and are in electrical contact with guide strips 104 as shown in Figs. 13 and 14. The strips 104 are mounted each individually insulated on a panel 105 of insulating material. The free ends of the brushes make contact with price conductors or leads 106. The digital designation of the price lead 106 with which a brush 103 is in contact being indicated by 107 can be seen in the space between the brush handle 108 and the brush support 109. Brushes 103 for the designations or codes "2111" to "2118," inclusive, and "2121" are shown in Figure 13 of the drawings as 103a to 103i, respectively. Although eight brush sets are shown as comprising one tens group, any number of these sets may be used in accordance with the digits utilized in providing the numerical codes. The first group of price leads 106 connect with a dollars counting chain 434 (Fig. 20) and a half-cent relay 516 (Fig. 19) in an adding machine or adding relay circuit 216 (Figs. 19 and 20) or to operating solenoids if a mechanical adding machine is used. It is assumed that any article priced in dollars will not include a one-half cent in its price. The second group of price leads 106 connects with a tens cents counting chain 432 (Fig. 20) and a third group with a units cents counting chain 430 (Fig. 20). The code "2112," represented by the brushes 103b, is shown set to represent a price of one dollar and ten cents and the code "2113," as represented by the brushes 103c, is set for twenty three and one-half cents. The panels are mounted in locked cabinets so there can be no tampering with prices by unauthorized persons. The various guide strips 104 are wired to contacts of price relays, such as a plurality of relays 410, in a price relay circuit 211 (Fig. 21) which are mounted on a strip beside the price brush and multiple panel. These price relays, which may include one for each code or article or relays common to several articles, are selectively operated by the units price selection circuit 212 (Fig. 26) and a hundreds price selection circuit 210 (Fig. 21) to complete circuits through selected ones of the brush guides 109 to the three similarly designated brushes representing the dispensed article, thereby to cause the operation of the adding relay circuit 216 to cause the addition of the price of the article concurrently with its delivery.

Figure 24:
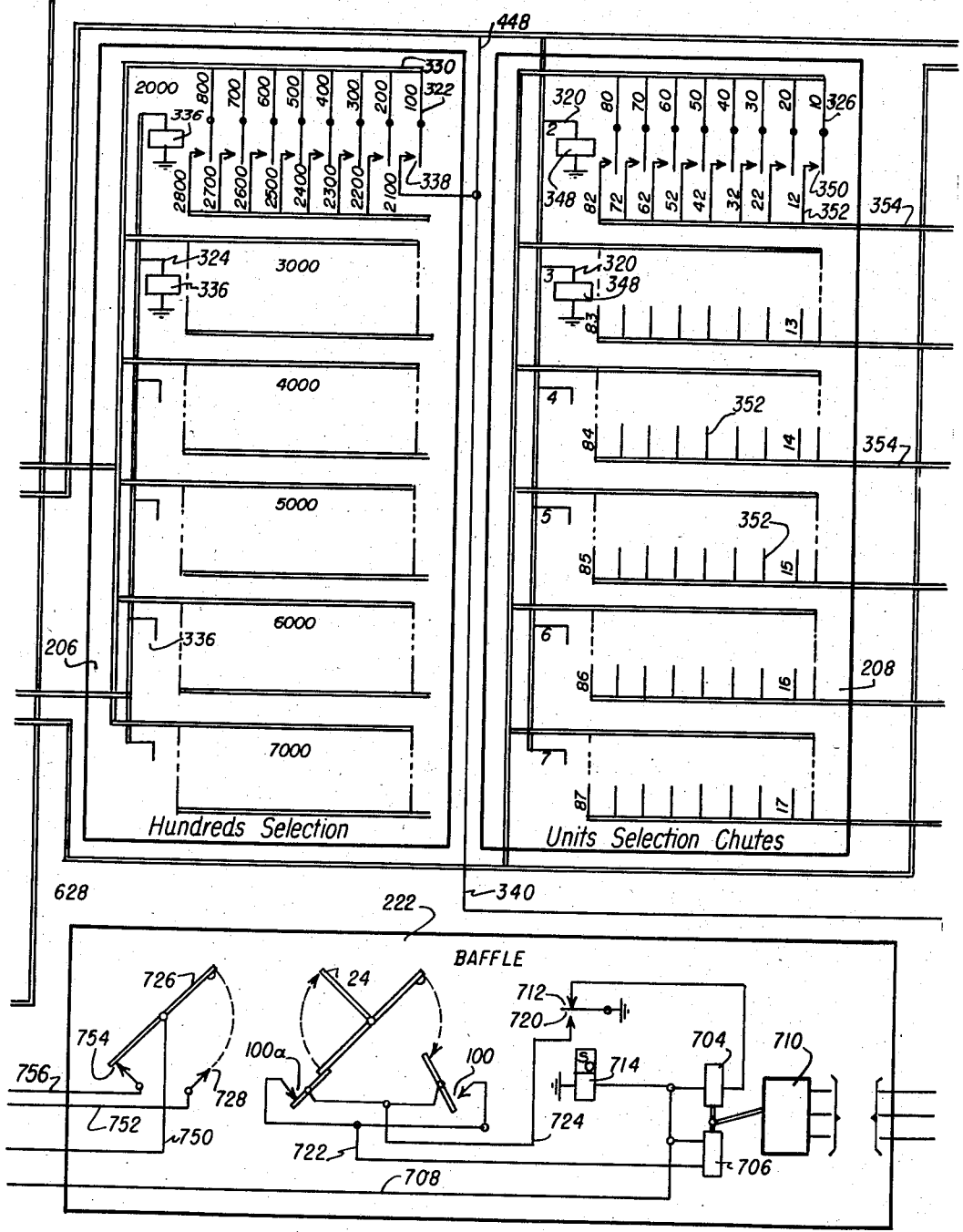

Fig. 15 shows schematically all the electrical elements indicated in Fig. 1 and connects them by lines with an arrow indicating the direction of control, selection or other progress which goes on electrically when an order list passes through the order machine and printer. The relative placing of the elements is substantially the same as the locations shown on the floor plan layout in Fig. 1. The order machine and printer 46—47 sends the major intelligence as read by the brushes from the punched hole combinations to the decoder, such as the decoding circuit 202 shown in Fig. 22 of the drawings. The decoder translates the numerical code to operate chute selection relays in a hundreds chute selection circuit 206 (Fig. 24) and a units chute selection circuit 208 (Fig. 24). These relays operate one of a plurality of chute solenoids 87a or 94a to cause an article to be dropped from a chute to the baffle. Concurrently, the decoder 202 also sends its numerical code over leads to the hundreds price selection relays in the circuit 210 (Fig. 21), mounted on common frame 27, and to the units price selection relays in the circuit 212 (Fig. 26) mounted on the adding relay frame 28. These relays prepare circuits for the price brush relays 410 mounted near the price translation brushes and price multiple in the price translation cabinets 29. Price leads connect this price multiple with the adding relays in the adding relay circuit 216 on the frame 28. When the end of the list passing through the order machine is reached, a brush contact in the order machine 46 signals the control circuit on the common frame 27 which through the baffle relays on the same frame starts the baffle drive motor near chutes 25 causing the baffle to dump its contents onto one associated contiguous conveyor belt which conveys the entire order to the assembly point 23 (Fig. 1). The control circuit also starts the print and record relays on common frame 27 and order total lamp relays on frame 30. The print and record relays controlled by the adding relay totals set the type wheels in the printer 47, the keys of the recording machine 31, and the order total lamp relays so that the order total lamps will be lighted. Still under control of the print and record relays the printer 47 will print, the adding relays 28 will clear ready for the next order, the recording machine 31 will list and the type wheel will restore to normal. The rectifier 26 furnishes direct current for all relay, solenoid and lamp operations.

*Operating circuit*

The operating circuit (Fig. 15) is controlled by the tape 37 which was previously provided with a plurality of spaced groups of perforations representative of the articles selected by the customer (Fig. 6). These perforations provide a numerical designation for each of the articles to be dispensed and for purposes of illustration comprise a four-digit numerical designation including a digit in each of the units, tens, hundreds and thousands denominational columns. The control tape 37 is placed in the order machine 46 and moved therethrough by suitable driving means so that each of the series of perforations are sequentially sensed by means provided in this order machine. The order machine 46 is connected to and controls a decoding circuit 202 so that a series of relays therein are operated in accordance with the perforations of a particular group sensed by the machine 46.

In order to connect grounded battery to a single conductor representaive of a selected digit in each of the units, tens, hundreds and thousands denominational groups, the grounded battery is connected to the conductors selected by operation of the decoding circuit 202 by a control circuit 204 after a predetermined interval of time initiated by the operation of the relays in the decoding circuit 202. Accordingly, the function of the decoding circuit 202 is to provide a continuous path representative of a selected digit in each of the units, tens, hundreds and thousands denominational groups in accordance with the plurality of perforations in the tape 37 designating or representing the numerical designation of a particular article to be dispensed.

The hundreds and thousands energized conductors or conductive paths provided by the decoder 202 are connected to a hundreds chute selection circuit 206, and this circuit is controlled by these conductors so that a relay therein associated with the energized thousands conductor is operated to establish a conductive path from the energized hundreds denominational conductor to a thousands-hundreds chute selection relay at the chutes 25.

The units and tens conductors energized by the operation of the decoding circuit 202 are connected to a units chute selection circuit 208 so that the energized units conductor operates a relay to interconnect the energized tens denominational conductor with a chute selection relay conditioned for operation by the energization of the thousands-hundreds selection chute relay at the chutes 25.

Therefore, the operation of the circuits 206 and 208 conditions a particular chute operating relay 87a or 94a associated with one of the dispensing chutes shown in Figs. 9, 10, and 11 for operation and, subsequently, operates this relay to dispense a predetermined article in accordance with the numerical designation of this article provided by the plurality of perforations in the tape 37.

To provide a means for translating the numerical designation of the selected article into information relating to the cost of the selected article, a particular relay in a hundreds price selection circuit 210 is operated simultaneously with the thousands-hundreds chute selection relay at the chutes 25 to condition a plurality of conducting paths in a price relay circuit 211 for a subsequent application of energization thereto. A selected one of the conditioned paths is connected to battery by a units price selection circuit 212, which is connected to and controlled by the units and tens denominational conductors of the decoding circuit 202, in accordance with the units and tens denominational conductors provided with battery by the decoding circuit 202 under the control of the sensed group of perforations in the control tape 37.

A price multiple or translation board 214 is provided with a plurality of conductors representative of each of the digits in the following denominational groups, units cents, tens cents, and units dollars. Each of the paths through the price relay circuit 211 is connected through the plurality of manually adjustable brushes 103 to a selected combination of the conductors 106 in the price board 214 so that upon applying battery to a particular path through the price relay circuit 211, this battery is subsequently applied through the selected conductors of the price translating board 214 in accordance with the numerical designation of the cost of the article represented by the selected path.

To provide a means for totalizing the cost of a series of selected articles the price multiple board 214 is connected to and controls an adding relay circuit 216. The plurality of conductors energized by the completion of the path through the price relay circuit 211 and price multiple board 214 under the control of the numerical designation of the selected article are connected to counting chains in the adding circuit 216 in accordance with the denominational grouping of the conductor on the price multiple board, i.e., the units cents conductors in the price multiple board 214 are connected to a units cents counting chain in the adding circuit 216, so that upon energization of a particular conductor representing a selected digit within the selected denominational group on the price multiple board 214, the associated counting chain is energized to advance a stepping relay in the adding relay circuit 216. As successive groups of perforations are sequentially advanced through a sensing position in the order machine 46, the stepping relays in the circuit 216 are progressively advanced in accordance with the price designations of the selected articles under the control of the price multiple board 214 and the adding circuit 216.

Concurrently with providing battery to the selected conductors in the decoding circuit 202, the control circuit 204 applies battery to an item counting circuit 220 under the control of the order machine 46. Each time a new group of perforations is moved into sensing position, the control circuit 204 energizes the item counting circuit 220 in accordance with the number of articles to be dispensed. The item counting circuit 220 is connected to and controls a counting chain in the adding circuit 216 and, consequently, controls a separate group of stepping relays in the circuit 216. Accordingly, when the end of a predetermined list 37 is reached the adding relay circuit 216 includes stepping relays moved into a plurality of positions representative of the total number of items dispensed by the dispensing apparatus and also the total cost of the articles so dispensed.

As the end of the tape is reached, the control circuit 204 is actuated to operate a baffle control circuit 222 which rotates the baffle 24 (Fig. 12) to discharge the articles placed therein on to one of the plurality of conveying means provided. To accomplish this result, the baffle control circuit 222 is connected to and controls a baffle drive motor 98.

Simultaneously with operating the baffle motor to discharge the plurality of selected goods, the control circuit 204 actuates a printing control circuit 226 so that a plurality of stepping relays therein move into positions corresponding to the digits in the totals of items dispensed and cost of items dispensed on the stepping relays in the adding relay circuit 216. The stepping relays in the printing control circuit 226 are mechanically interconnected with the plurality of printing wheels 68 in the printer 47 so that as the stepping relays in the circuit 226 move into their predetermined positions representative of the total of the number of items dispensed and the total price of these items, these printing wheels are moved into corresponding positions.

Also simultaneously with actuating the baffle motor 98, energization is applied to an order total light panel 230 which is interconnected with and controlled by the adding relay circuit 216 and an order total circuit 218. Accordingly, energization of the lamp panel 230 produces a visible indication of the totals carried by the circuit 216.

The circuit 216 is also interconnected with a recording machine 232 which may be positioned in the office of a supervisor in the grocery store so that the cumulative total of the items dispensed and the price thereof is also available at this location.

After the printing control circuit 226 has moved all of the printing wheels 68 into position, the printing solenoid 69 is energized to produce a visible indication on the tape 37 of the total number of items dispensed and the total cost of these dispensed items.

Upon completion of the printing operation, the operating system is reset and conditioned for operation under the control of a sequence of perforations on a second tape 37. However, this conditioning does not affect the totals carried by the recording machine 232 and, accordingly, an accumulative record of the total number of items dispensed and the cost thereof is retained at this location.

Order machine

Figure 17:
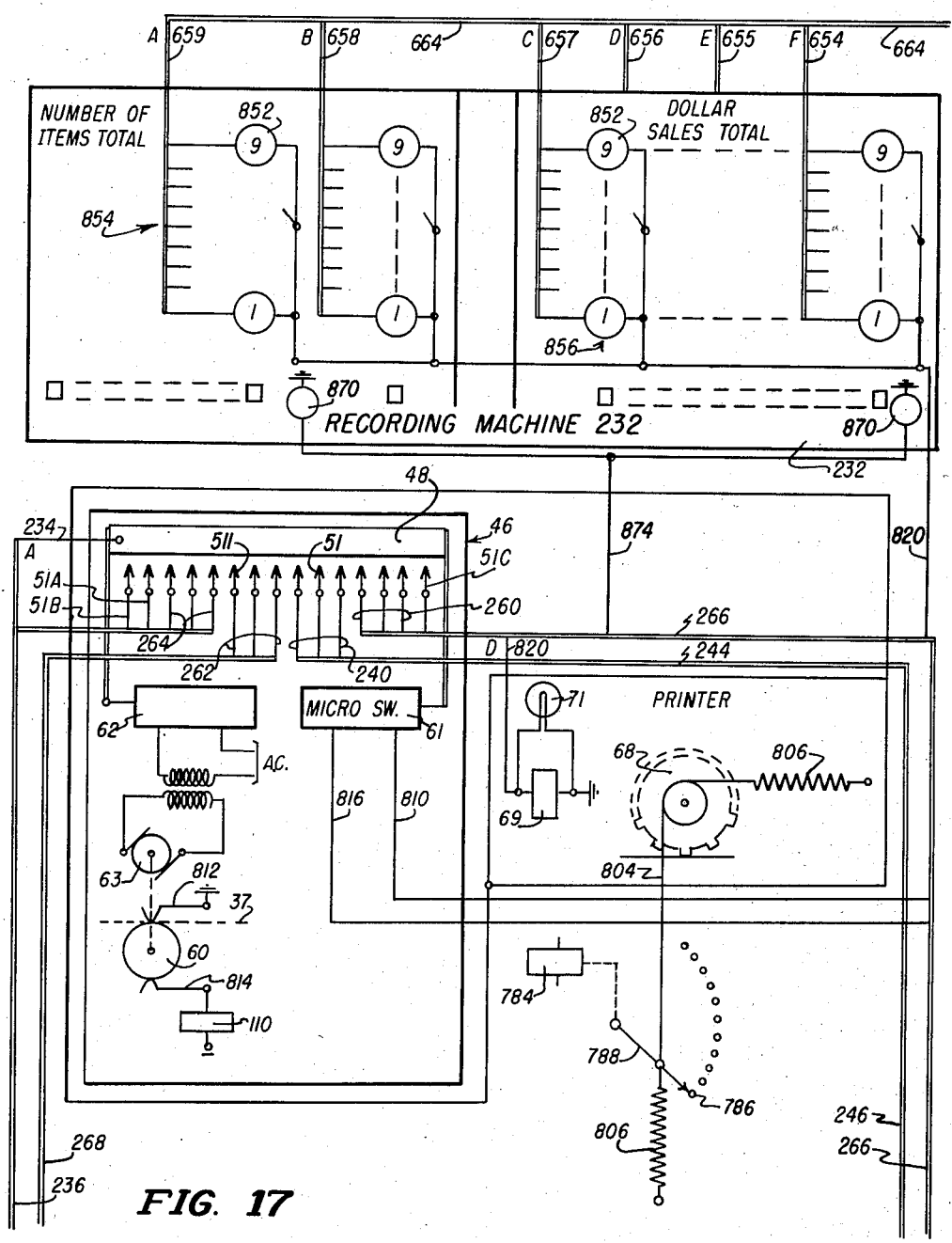

The function of the order machine indicated generally as 46 is to operate a plurality of relays in the decoder circuit 202 in accordance with the series of permutations of perforations on a tape 37 representative of the numerical designation or code of the articles to be dispensed. As shown in Figs. 7, 8 and 17 of the drawings, the order machine 46 includes a housing adapted to receive the control tape 37 and suitable driving means for advancing this tape through the machine to sequentially sense the plurality of groups of perforations representative of the numerical designations or codes of the articles to be dispensed.

Figure 22:
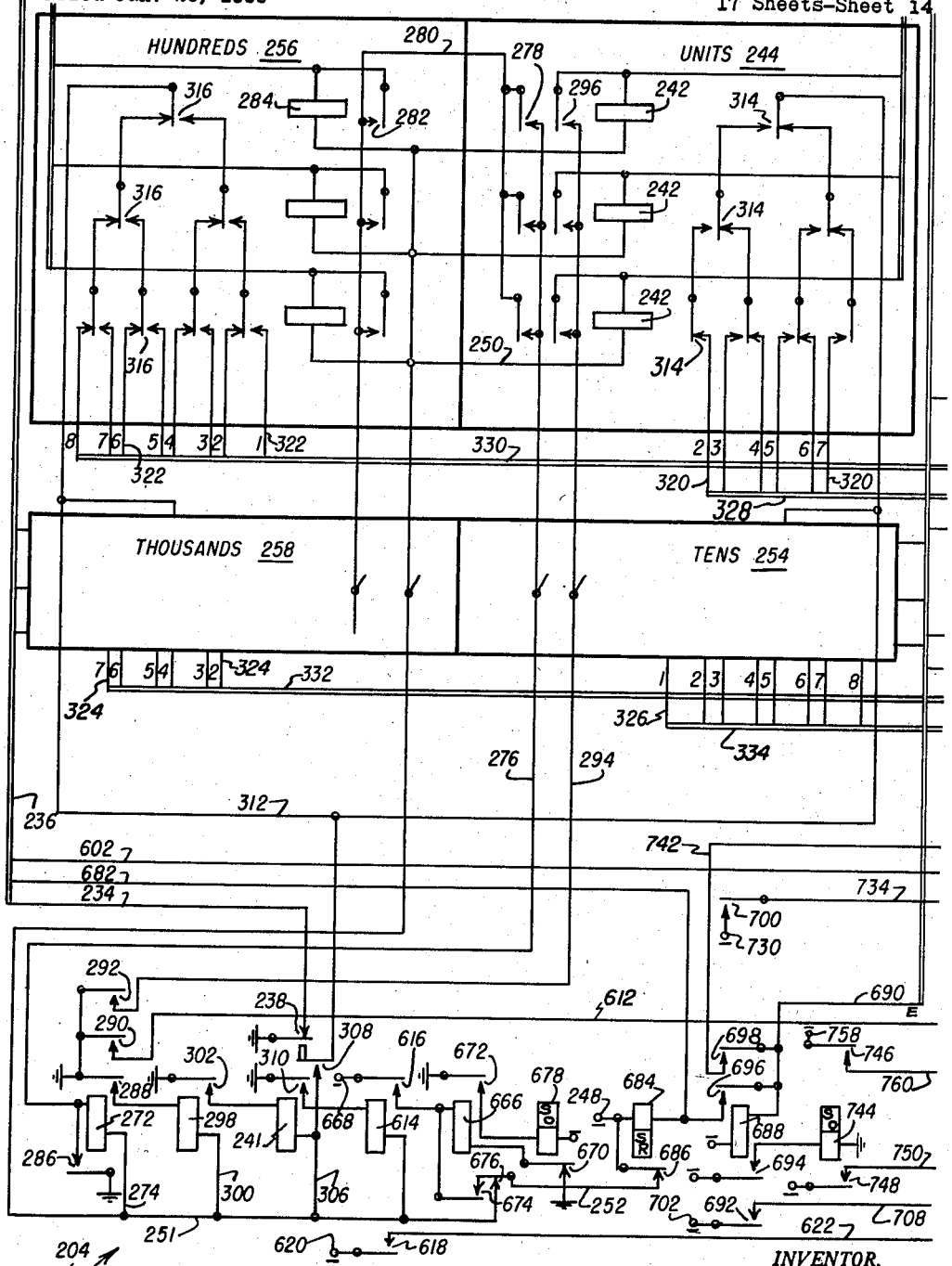

When the tape 37 is inserted into the housing the cover or ground plate 48 carried by the housing is moved downwardly to place the tape 37 in engagement with a driving roller 60 and concurrently therewith closes the switch 62 to energize the drive motor 63 which is interconnected with the drive roller 60. Movement of the tape 37 by the drive roller 60 advances the first group of perforations into a sensing position interposed between the plurality of brushes 51 and the plate 48 of the housing which is connected to ground through a conductor 234, a cable 236, and a normally closed contact 238 of a normally unoperated relay 241 in the control circuit 204 (Figs. 17 and 22).

To provide selective operation of relays in the decoding circuit 202 under the control of the order machine 46, different groups 240, 260, 262, and 264 of the plurality of sensing brushes 51 are interconnected with relays in the decoding circuit 202. The sensing brush groups 240, 260, 262, and 264 each include three brushes 51 adapted to contact the plate 48 through perforations in the tape 37 and thus connect ground to the relays in the decoder circuit 202 through cables 246, 266, 268, and 236, respectively. For purpose of illustration, the groups 240, 260, 262, and 264 indicate the brushes responsive to indicia or perforations representative of the units, tens, hundreds, and thousands denominational digits, respectively, in the numerical designation of the article to be selected.

Decoding circuit

The decoding circuit 202 (Fig. 22) utilizes the sensed information provided by the order machine 46 in the form of selectively grounded brushes 51 to operate a group of relays in this circuit to set up a plurality of conductive paths, each of which is representative of one of the digits in the four denominational columns of the numerical designation of the article to be dispensed. The decoding circuit 202 also triggers the control circuit 204 to energize each of the conductive paths a predetermined interval of time following the operation of the relays in the circuit 202 so that the decoding circuit provides article selection information to the circuits 206, 208, 210, and 212 (Fig. 15) in the form of a plurality of energized conductors, each energized conductor being representative of a different digit in the numerical designation of the article to be dispensed.

The decoding circuit 202 includes a units decoding circuit 244, a tens decoding circuit 254, a hundreds decoding circuit 256, and a thousands decoding circuit 258 which are controlled by and interconnected with the order machine 46 by the cables 246, 266, 268, and 236, respectively. The units decoding circuit 244 comprises a plurality of relays 242 which are selectively energized under the control of the brush group 240 (Fig. 17) to operate a plurality of contacts 314 connected therewith to provide a single conductive path therethrough. The hundreds decoding circuit 256 includes a plurality of relays 284 selectively operated by the brush group 262 to operate a plurality of contacts 316 to provide a single conductive path therethrough.

The tens decoding circuit 254 is similar to the units decoding circuit 244 except that the tens decoding circuit includes an additional pair of contacts similar to the contacts 314 for the purpose of providing means for establishing conductive paths representative of two additional digits in the tens denominational column. The thousands decoding circuit 258 is similar to the hundreds decoding circuit 256 except that the thousands decoding circuit includes two fewer contacts 326 and, accordingly, provides a plurality of conductive paths representative of digits in the thousands denominational column which is two smaller in number than that provided by the hundreds decoding circuit 256.

The relays 242 in the units decoding circuit 244 are operated to close a plurality of contacts 278 and 296, and to operate the contacts 314 associated therewith by a circuit extending from the grounded contact 238, through conductor 234, cable 236 (Figs. 17 and 22), ground plate 48, brush group 240, cable 246, operating windings of relays 242, conductors 250, 251, and 252, to a grounded battery terminal 248. One or any group of the hundreds decoding relays 284 are energized to close the contacts 282 and the contacts 316 associated therewith by a similar circuit extending from ground plate 48 through brush group 262, cable 268, operating windings of the relays 284, and thence to grounded battery at the terminal 248 through the conductors 250, 251, and 252. The tens decoding circuit 254 and the thousands decoding circuit 258 are selectively energized under the control of the brush groups 260 and 264, respectively, to operate relays therein in accordance with the perforations provided by the tape 37.

The closure of the contacts 278 and 282 in the units and hundreds decoding circuits initiates operation of the control circuit 204 by interconnecting the grounded plate 48 (Fig. 17) with one side of the operating winding of a relay 272 (Fig. 22) in the control circuit 204 through a circuit including cable 268 (Figs. 17 and 22), closed contact 282, conductor 280, closed contacts 278, conductor 276, and the operating winding of the relay 272. The other side of the operating winding of relay 272 is connected to the battery conductor 251 through a conductor 274 so that upon closure of at least one of the contacts 282 in the hundreds decoding circuit 256, and upon closure of at least one of the contacts 278 in the units decoding circuit 244, a circuit is established from ground through the operating winding of the relay winding 272 to grounded battery at terminal 248 to operate relay 272 and close a plurality of contacts 286, 288, 290 and 292 controlled thereby. In view of the similarity of the thousands decoding circuit 258 to the hundreds decoding circuit 256 and, further, in view of the similarity of the tens decoding circuit 254 to the units decoding circuit 244, operation of a single relay in either the hundreds decoding circuit 256 or the thousands decoding circuit 258 and a single relay in either the units decoding circuit 244 or the tens decoding circuit 254 closes a path for energizing the first relay 272 in the control circuit 204.

Since this relay is only energized following operation of a single relay in each of the two pairs of decoding circuits, it is impossible to initiate operation of the control circuit 204 under the control of accidental grounds such as may be provided by tears or conductive particles in the tape 37.

Closure of the contact 286 provides a locking circuit for the relay 272 and maintains this relay in an operative condition so long as battery is connected to the battery conductor 251.

Closure of the grounded contact 292 provides a locking circuit for the plurality of relays in the units decoding circuit 244 and tens decoding circuit 254 by connecting ground to the operating windings of the relays in these circuits through a conductor 294 and any closed contacts 296. The relays in the hundreds decoding circuit 256 and the thousands decoding circuit 258 are held operated by a locking circuit including grounded contact 286, conductor 276, closed contacts 278, conductor 280 and closed contacts 282.

Closure of the grounded contact 288 operates a delay relay 298 in the decoding circuit 204 through a circuit including grounded battery terminal 248, conductors 251, 252, a conductor 300 and the operating winding of the relay 298. Operation of the relay 298 closes a grounded normally open contact 302, associated therewith, to operate the battery relay 241 by completing a circuit from ground through the operating winding of the relay 241 and a conductor 306 to the battery conductor 251.

Operation of the relay 241 closes a pair of contacts 308 and 310 and opens the contact 238. Opening the contact 238 removes ground from the plate 48 and accordingly removes ground from the plurality of operated relays in the units, tens, hundreds and thousands decoding circuits. However, the operated relays are not released at this time because of the locking circuits provided therefor by the control circuit 204. However, the removal of ground from the plate 48 prevents improper actuation of any of the relays under imperfections in the tape as the tape 37 is moved to the next sensing position.

Closure of contact 308 interconnects the battery conductor 251 through the conductor 306, closed contact 308, and a conductor 312 to the plurality of contacts 314, 316, and similar contacts associated with the tens decoding circuit 254 and thousands decoding circuit 258. Since a single conductive path is conditioned for energization by the selective operation of the relays in each of the decoding circuits 244, 254, 256, and 258 under the control of the order machine 46, the energization provided by the conductor 312 is transmitted through this single conditioned path to one of a plurality of conductors bearing a numerical designation corresponding to the numerical designation represented by the permutation of operated relays in each of the decoding circuits. The interposition of the delay relay 298 between the relay 272 and the battery relay 241 provides a time delay prior to an application of energization to the conductive paths set up in the decoding circuits 244, 254, 256, and 258 which is long enough to insure complete operation of the relays therein and to allow the brushes 51 to become centered in the perforations in the tape 37.

For instance, in the hundreds decoding circuit 256 none of the relays is shown in an operated state so that a single conductive path is set up from the conductor 312 through the multiplicity of contacts 316 to a hundreds conductor 322 designated by the digit "8." Accordingly, when none of the relays 284 is operated under the control of the order machine 46 the digit "8" is the hundreds denominational designation of the article to be dispensed, and the conductor 322 designated by the digit "8" is energized under the control of the circuit 204. The remaining conductors 322, as viewed in Fig. 22 of the drawings, are designated by the digits "7" to "1," inclusive, when considered from left to right. Obviously, operation of any one or combination of the relays 284 would interconnect the energized conductor 312 with a different one of the conductors 322 in accordance with the digit in the hundreds denominational column of the numerical designation of the article to be selected. The plurality of conductors 322 form a cable 330 which interconnects the hundreds decoding circuit 256 with the hundreds chute selection circuit 206.

The units decoding circuit 244, the tens decoding circuit 254, and the thousands decoding circuit 258 operate in the same manner as the hundreds decoding circuit 256 to selectively energize a single conductor 320, 326, or 324, respectively, having a digital designation corresponding to the digits in the numerical designation of the article to be selected. The thousands conductors 324 form a cable 332 which is connected to the hundreds chute selection circuit 206, and the units conductors 320 and tens conductors 326 form a pair of cables 328 and 334, respectively, to interconnect the units decoding circuit 244 and the tens decoding circuit 254 with the units chute selection circuit 208. Accordingly, the decoding circuit 202 provides article selection information to the hundreds chute selection circuit 206 and the units chute selection circuit 208 in the form of a pair of energized conductors representative of the digital designation in the thousands and hundreds denominational columns, and in the units and tens denominational columns, respectively.

Although the units decoding circuit 244 and the thousands decoding circuit 258 are shown as only providing conductive paths for the digits "2" to "7," inclusive, in their respective denominational groups, it is obviously within the scope of this invention to provide either a decreased or an increased number of digits available for selection within each of the denominational decoding circuits 244, 254, 256 and 258 in accordance with the necessity for providing a greater or smaller number of numerical designations for articles to be dispensed.

*Hundreds chute selection circuit*

The purpose of the hundreds chute selection circuit 206 (Fig. 24) is to operate a relay therein in accordance with the hundreds and thousands denominational designation of the article to be dispensed for the purpose of conditioning a chute control relay for operation under the control of the units selection chute circuit 208. To achieve this result, the hundreds chute selection circuit 206 includes a plurality of relays 336 having the operating windings thereof connected to ground and to a correspondingly designated thousands conductor 324. One of the relays 336 is operated from battery terminal 248 (Fig. 22) through the conductor 324 energized in accordance with the thousands denominational digit by the thousands decoding circuit 258. For instance, if grounded battery is applied to the conductor 324 designated by the digit "2," representing "2000," in Fig. 22, the similarly designated relay 336 (Fig. 24) is operated to close a plurality of contacts 338 associated therewith. Operation of the thousands selection relay 336 to close the plurality of contacts 338 associated therewith sets up a plurality of paths for the hundreds conductors 322 in accordance with the thousands designation of the article.

The cable 330 is multipled to the contacts 338 associated with each of the plurality of relays 336 so that upon energization of a selected one of the thousands relays 336, a path is completed from battery conductor 251 (Fig. 22) through the selected conductor 322 and cable 330 to and through one of the operated contacts 338 associated with the relays 336. For instance, in Fig. 24 of the drawings, it is assumed that the hundreds conductor 322 designated by the digit "1," representing "100," is energized by the decoding circuit 256 so that upon operation of the "2000" relay 336 a path is completed through a conductor 340 (Figs. 24 and 25) to operate a thousands-hundreds chute selection relay 342. Accordingly, the hundreds selection circuit 206 provides a means for operating a selected relay representative of the thousands and hundreds designation of the article to be dispensed.

Operation of the relay 342 (Fig. 25) closes a plurality of contacts 344 associated therewith so that ground is applied to a plurality of relays 346 comprising all of the chute selector relays within the selected thousands and hundreds group, i.e. "2100." By providing ground to the plurality of relays 346, these relays are conditioned for operation under the control of the units chute selection circuit 208.

Units chute selection circuit

The purpose of the units chute selection circuit 208 (Fig. 24) is to utilize the information provided by the selected and energized conductors 320 and 326, corresponding to the numerical designation in the units and tens denominational columns of the articles to be selected, for the purpose of operating one of the article dispensing or chute solenoids 87a or 94a associated with the chutes in Figs. 9, 10 and 11. To provide this function, the cables 328 and 334 (Figs. 22, 23 and 24) interconnect the decoding circuits 244 and 254 with the units chute selection circuit 208 and, in particular, the individual units conductors 320 comprising the cable 328 are connected to the operating windings of similarly designated relays 348.

The relay 348 associated with the energized units conductor 320 is operated to close a plurality of contacts 350 associated therewith. Each of the contacts 350 is connected to one of the tens conductors 326, and similarly disposed contacts 350 associated with each of the other relays 348 are connected to like designated conductors 326.

Therefore, operation of one of the relays 348 determines the unit designation of the chute solenoid 87a or 94a to be energized and prepares a plurality of paths for the tens denominational conductors 326 in accordance with the selected units denominational digit.

Each of the contacts 350 is also connected through conductors 352 and cables 354 (Figs. 24 and 25) to similarly designated relays 346 which are conditioned for operation under the action of the hundreds chute selection circuit 206. For purposes of illustration, it is assumed that the digit "2" designates the energized units conductor 320 so that a like designated relay 348 is operated, and it is also assumed that the tens denominational conductor 326 designated by the digit "1" is energized so that the relay 346 (Fig. 25) indicated by the number "12" is energized thereby. Accordingly, the relay 346 is conditioned for operation under the control of the energized thousands and hundreds conductors 322, 324 and operated under the control of the selected units and tens conductors 320, 326. In the example used, the operation of the relay 346 is in response to a permutation of perforations in the tape 37 representing an article having the numerical designation "2112."

Operation of the relay 346 operates the chute solenoid 87a or 94a associated with any of the gates 87, 94, or 96 (Figs. 9, 10, and 11) by closing a contact 358 to interconnect the grounded operating winding of the relay 356 with a battery terminal 360.

Although the control circuit for only one combination of hundreds and thousands denominational designations is shown, it is to be understood that the cables 354 are multipled to similarly arranged circuits under the control of relays similar to relay 342 and in which relays similar to 342 are provided for all of the permutations made possible by the provision of the different hundreds and thousands denominational conductors 324 and 322.

Units price selection circuit

The function of the units price selection circuit 212 (Fig. 26) is to selectively operate the price relay circuit 211 to provide selectively energized conductors for the price multiple board 214 by utilizing the information available in the form of the energized units and tens conductors 320 and 326. The circuit 212 performs this function by interconnecting the tens conductors 326 with a plurality of odd tens relays 362 and even tens relays 363 designated by numbers corresponding to the numerical designation of each of the conductors 326.

Figure 26:
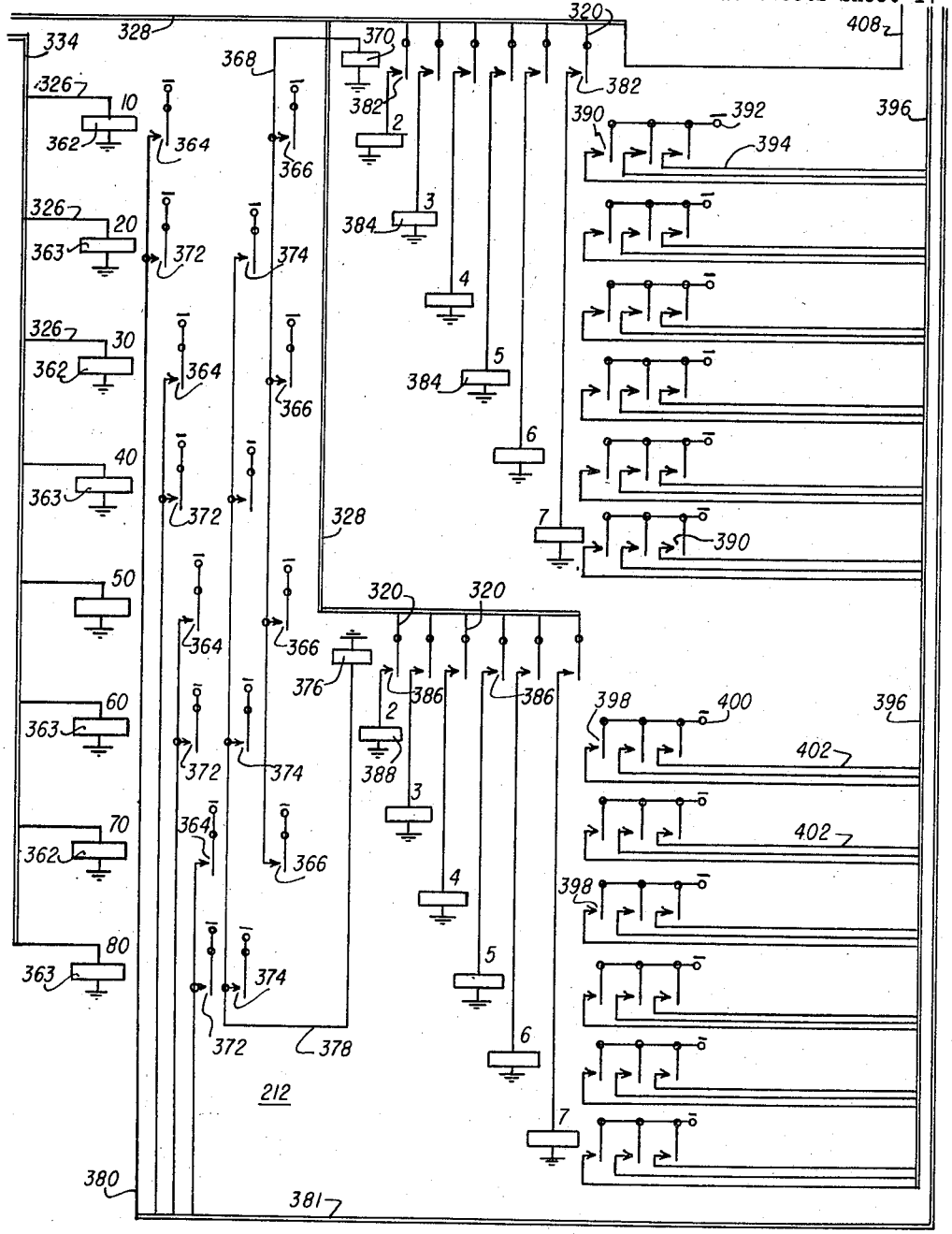

One of the plurality of relays 362 is operated in accordance with the conductor 326 energized by the decoding circuit 202 to close a pair of contacts 364 and 366 associated therewith. Each of the contacts 364 and 366 is connected to grounded battery and, upon closure of the contact 366, battery is connected through a conductor 368 to a common odd tens relay 370. As shown in Fig. 26 of the drawings, the relay 370 is adapted to be energized only by the operation of the odd tens relays 362.

Operation of one of the even tens relays 363 closes a pair of contacts 372 and 374 associated therewith to operate a common even tens relay 376 through a conductor 378 and a closed one of the contacts 374.

Operation of either relay of a pair of successive odd tens relays 362 or even tens relays 363 closes one of the contacts 364 or 372 to energize one of a plurality of conductors 380. As shown in Fig. 26 of the drawings, four conductors 380 are provided and form a cable 381 which interconnects the units price selection circuit 212 with the price relay circuit 211 (Fig. 21). The four conductors 380 are selectively energized to provide information to the price relay circuit 211 representative of which relay in the four odd and even pairs of tens digits relays 362 and 363 is operated, i.e., "10" or "20," "30" or "40," "50" or "60," and "70" or "80."

Operation of the odd tens relay 370 closes a plurality of contacts 382 to interconnect a plurality of relays 384 designated by units digits with correspondingly designated units conductors 320 comprising the cable 328. Similarly, operation of the even relay 376 closes a plurality of contacts 386 to interconnect a plurality of relays 388 designated by units digits with correspondingly designated units conductors 320.

Therefore, one of the relays 384 is operated when an odd tens denominational conductor 326 is energized and in accordance with the energization of a selected one of the units conductors 320. Operation of one of the relays 384 closes a plurality of contacts 390 to interconnect a battery terminal 392 with one triad of a plurality of conductors 394 forming a portion of a cable 396 which is connected to the price relay circuit 211.

In a like manner, operation of one of the relays 388 when a tens conductor 326 designated by an even digit is energized, and in accordance with the energization of a particular one of the units conductors 320, closes a plurality of contacts 398 associated therewith. Closure of any of the contacts 398 interconnects a grounded battery terminal 400 with the price relay circuit 211 through one triad of a plurality of conductors 402 forming a portion of the cable 396.

Consequently, the units price selection circuit 212 translates the article selection information provided by the energized conductors 320 and 326 into two types of information which is subsequently transmitted to the price relay circuit 211. A first type of information transmitted is coupled to the circuit 211 through the cable 381 and comprises the energization of a conductor 380 corresponding to the actuation of one of a successive pair of odd and even tens relays 362 and 363. For example, the conductor 380 in Fig. 26 positioned to the left is provided with battery through either the odd contact 364 or the even contact 372 in response to energization of either of the "10" relay 362 or the "20" relay 363 under the control of the "10" or "20" designated conductor 326.

The other type of information transmitted to the price relay circuit 211 comprises the energization of a wire triad, including either the conductors 394 or the conductors 402, in response to the operation of a relay designated by a particular units digit. The two groups of units relays 384 and 388 are conditioned for operation in accordance with the odd or even classification of the tens denominational digit in the numerical designation of the article to be dispensed. Therefore one of the wire triads including either the conductors 394 or 402 are energized in accordance with the units digit in the designation of the article to be dispensed and, also, in accordance with the odd or even character of the tens digit in the numerical designation of the article to be dispensed.

Hundreds price selection circuit

The hundreds price selection circuit 210 is operated in response to the information provided by the decoding circuit 202 and by the hundreds chute selection circuit 206 to condition the price relay circuit 211 for operation under the control of the units price selection circuit 212. The circuit 210 comprises a single relay 404 (Fig. 21) having an operating winding, one side of which is grounded and the other side of which is connected to the contact 338 (Fig. 24) through a conductor 408 (Figs. 24, 26 and 21) and the cable 328 (Figs. 25 and 26). The thousands-hundreds price selection relay 404 is operated concurrently with the thousands-hundreds chute selection relay 342 (Fig. 25), and since both relays are selectively energized under the control of the hundreds chute selection circuit 206, the simultaneous operation of the relays 342 and 404 not only conditions a plurality of chute selection relays 346 (Fig. 25) for operation under the control of the units chute selection circuit 208 but also conditions a group of price relays 410 (Fig. 21) for operation under the control of the units price selection circuit 212. The relays 410 are conditioned for operation since relay 404, in operating, closes a plurality of contacts 412 associated therewith to connect one side of the operating winding of these relays to ground.

Price relay circuit

The function of the price relay circuit 211 (Fig. 21) is to utilize the information provided by the units price selection circuit 212 and the hundreds price selection circuit 210 to produce a single conductive path, including three parallel conductors, from a source of energization to the price multiple board 214 for the purpose of producing information representative of the cost, in dollars and cents, of the selected article dispensed by the chute solenoid 87a or 94a (Figs. 9, 10, 11 and 25).

The operating windings of the relays 410, one side of which is grounded under the control of the hundreds price selection circuit 210, are also connected to the conductors 380 so that a predetermined one of the relays 410 is operated in accordance with the selective energization of one of the conductors 380 by the units price selection circuit 212. Operation of one of the relays 410 closes a plurality of contacts 414 associated therewith.

Closure of the plurality of contacts 414 interconnects the plurality of conductors 394 and 402 with like designated conductors forming a cable 416. As viewed in Fig. 21, the triad of conductors 394 shown comprise the group of conductors designated by the units digit "2" which are energized under the control of the odd relay 370, and the triad of conductors 402 shown represent the conductors 402 designated by the digit "7" energized under the control of the even relay 376. For clarity, the intervening triads of conductors 394 and 402 are not shown in the drawings.

Therefore, the function performed by the price relay circuit 211 is to utilize the information made available by each of the decoding circuits 244, 254, 256, and 258 (Fig. 22) through the energization of selected units, tens, hundreds and thousands conductors in order to condition for operation a plurality of relays 410 falling within a thousands-hundreds classification selected in accordance with energization of the thousands and hundreds conductors 324 and 322, respectively. The relays 410, having been conditioned for operation, are operated by an energized conductor representative of a selected successive odd and even pair of digits in the tens denominational group.

Operation of this selected relay 410 closes a plurality of contacts to interconnect the plurality of conductors 394 and 402 with similarly designated conductors comprising a cable 416 so that the operation of the relay 410 and the energization of a selected triad of either of the conductors 394 or 402 in accordance with the units digit and in accordance with the odd or even character of the tens digit associated therewith effectively provides a single conductive path including an energized triad of either of the conductors 394 or 402.

Price multiple board

The price multiple board converts the information conveyed thereto through the cables 416 into information directly proportional to the price of the article dispensed. Since the information presented to the price multiple board 214 is in the form of energized wire triads, this information is easily translated into information directly proportional to the dollars and cents price of the article dispensed by utilizing the structure disclosed in Figs. 13 and 14 of the drawings.

The price multiple board 214 essentially comprises three groups 418, 420 and 422 of spaced parallel conductors 106, each of which is designated by a digit. As shown in Fig. 21, the groups 418, 420 and 422 represent units cents, tens cents, and units dollars respectively, and each of the conductors 106 included in the three groups is designated with successive digits "1" to "9," inclusive, and "0" when considered from left to right in Figs. 13 and 21 with the exception of the units dollars group 422 which includes the digital designations "1" to "8," inclusive, "½" and "0." For convenience, the "½" cent is provided in the units dollars group inasmuch as an item costing one dollar or more usually is priced in even cents.

The price multiple board 214 (Figs. 13 and 14) also includes a plurality of conducting strips 104, each of which extends transversely across one group of the conductors 106 and is spaced thereabove. Each of three horizontally spaced strips 104 is connected to a conductor 394 or 402 in one of the wire triads. Since the conductors 394 are energized under the control of the odd relay 370, each triad 394 is connected to strips 104 representing an odd tens denominational digit such as "2112" whereas the conductors 402 are connected to strips 104 having an even tens denominational digit such as "2122."

The price brushes 103 (Fig. 14) are manually moved into positions representative of the cost of the article selected in accordance with the numerical designation of this selected article. For example, the article bearing the numerical designation "2112" costs one dollar ten cents as shown by the positions of the brushes 103b and the article bearing the numerical designation "2113"

costs twenty-three and one-half cents. Accordingly, when a particular wire triad including a plurality of conductors 394 or 402 is energized in accordance with the numerical designation of the article to be dispensed, these conductors are connected through the brushes 103 to the particular conductors 106 with which these brushes are in electrical contact.

Therefore, the function of the price multiple board 214 is to convert the information relating to the numerical designation of the article selected, which, in this instance, is provided by the energization of a selected wire triad, into information directly representative of the numerical cost of this selected article, and this function is provided by means of energizing a single conductor 106 in each of the groups 418, 420 and 422 which is designated by a digit in the cost of the article in each of the units cents, tens cents and units dollars groups. This translation to cost information from the article selection information which is provided by the price multiple board 214 is extremely flexible and may easily be adapted to compensate for varying prices in the articles since only the three brushes 103 associated with a particular article need be moved to vary the price thereof.

Adding relay circuit

The adding relay circuit 216 (Figs. 19 and 20) produces a series of discrete pulses corresponding in number to the digital designation of the price of the articles, which designation is provided to the circuit 216 by the price multiple board 214. The circuit 216 subsequently couples the series of discrete pulses to a plurality of stepping relays wherein the plurality of discrete pulses representative of the digital designation of the price of the articles dispensed are totaled to provide a total cost of all of the selected articles. The adding circuit 216 also produces another series of discrete pulses corresponding in number with the number of articles dispensed by the system under the control of the item counting circuit 220.

The adding relay circuit 216 advances a plurality of stepping relays therein into positions cumulative corresponding to the total of discrete pulses received which correspond both to the total price of the articles dispensed and also to the total number of articles dispensed. The circuit 216 is interconnected with the printing control circuit 226 and the order total circuit 218 and controls these circuits in accordance with the totals represented by the positions of the plurality of stepping relays. The adding relay circuit 216 also actuates the recording machine 232 to provide a permanent cumulative record of the above totals.

The adding relay circuit 216 (Fig. 20) is interconnected with the plurality of conductors 106 in the price multiple board 214 by a plurality of cables 424, 426, and 428 which interconnect a units cents counting chain 430, a tens cents counting chain 432, and a units dollars counting chain 434 with the similarly designated groups of conductors 418, 420, and 422, respectively.

The units cents counting chain 430 comprises a plurality of differential relays 436 having two operating windings 438 and 440. Each of the relays 436 is designated by a digit and has the winding 438 thereof grounded at one side and connected to a like designated one of a plurality of conductors 442 forming the cable 424. Upon energization of a selected one of the conductors 442 under the control of the price multiple board 214, the relay 436 is operated to close a plurality of contacts 444, 446, 448, 450 and to open a contact 452.

Closure of the contact 446 interconnects the operating winding 438 with grounded battery at a terminal 483 through a voltage dropping resistor 484. The grounded battery at terminal 483 maintains the lockup or operating winding 438 energized in the event of the removal of energization from the conductor 442 and prevents the relay 436 from being released at that time.

Closure of the contact 444 interconnects grounded battery at terminal 488 with the operating winding or lockup winding 438 of the relay 436 designated by a digit one lower than that designating the relay 436 operated under the control of an energized conductor 442. This sequential operation of the relays 436 in the units cents counting chain 430 continues until the last relay 436 is reached, and these operated relays are locked in this condition by the application of battery from the plurality of terminals 483 through the dropping resistors 484.

Closure of the contacts 448 interconnects a grounded battery at terminal 453 to the grounded operating winding of a motor magnet 456 through a conductor 454. Energization of the relay 456 closes a plurality of contacts 462 and 464 and opens a contact 466. Operation of the relay 456 also steps a latching arm (not shown) associated with each of the switch arms 468, 470, and 472 to condition these arms for movement through a single step upon deenergization of the motor magnet 456. However, these arms do not move until the energization is removed from the motor magnet.

Closure of the contact 464 applies ground through a conductor 476 to operate a steering relay 478 having its operating winding connected to battery at terminal 479. Operation of the relay 478 closes a contact 480 and opens a contact 486 which is interposed between the operating winding of the motor magnet 456 and the source of energization at battery terminals 453.

The closure of the contact 480 applies the grounded battery connected to the terminal 479 through the operating winding of the relay 478, a conductor 482, and the plurality of normally closed contacts 452 to the closed contact 450 associated with the first of the series of energized relays 436. The battery applied to the operated contact 450 is applied through the operating coil 440, one side of which is connected to ground to produce a current flow therein opposite to that produced in the lockup winding 438.

The opening of the contact 486 under the control of the steering relay 478 breaks the circuit energizing the motor magnet 456, and, accordingly, the contacts 462 and 464 are opened and the contact 466 is closed. The opening of the contact 464 removes ground from the operating winding of the steering relay 478, but this relay remains operated by virtue of the ground provided through the serially connected winding 440 of the first operated relay 436.

The current produced in the winding 440 of the first energized relay 436 is not large enough in magnitude to overcome the holding effect produced by the energization of the operating winding 438 when this winding is energized both by battery applied to the conductor 442 and by battery connected through the operated contact 446. However, the removal of energization from the conductor 442 under the control of the circuit 204 (Fig. 22) permits the winding 440 to release the first operated relay 436 thereby opening the plurality of contacts 444, 446, 448 and 450 and closing the contact 452.

Opening the contact 450 removes ground from the operating winding of the steering relay 478 so that the contact 480 is opened and the contact 486 is closed. Opening the contact 446 removes energization from the lockup winding 438 by interrupting the circuit between this winding and grounded battery at the terminal 483. Opening the contact 444 removes the energization from the lockup winding 438 of the relay 436 designated by the next lower digit, but this relay remains operated under the control of the energization provided at the battery terminal 483 associated with that relay.

Opening the contact 448 produces no effect on the control circuit inasmuch as the contacts 448 associated with the remaining energized relays 436 remain closed and, accordingly, battery is applied to the conductor 454. The battery applied to the conductor 454 is once again applied to the operating winding of the motor magnet 456 upon closure of the contact 486 due to the deenergization of the steering relay 478. Operation of the relay 456 once again advances a latch arm to condition each of the stepping switch arms 468, 470 and 472 for movement to the next contact upon removal of the energization of the motor magnet 456.

The operation of the motor magnet 456 to close the plurality of contacts 462 and 464 and to open the contact 466 produces the same result described above in conjunction with the initial energization of this motor magnet.

The remaining energized relays 436 are sequentially deenergized under the control of the steering relay 478 and their release windings 440 to produce a series of discrete pulses as described in conjunction with the initial operation of the motor magnet 456 until such time as the relay 436 designated by the digit "1" is reached. Energization of the release winding 440 of the relay 436 designated by the digit "1" opens the last closed contact 448 and removes all source of energization from the conductor 454 so that energization is not available for actuating the motor magnet 456 to sequentially advance the plurality of switch arms 468, 470 and 472 to additional contacts.

The repeated opening and closing of the contacts 462 and 466 controlled by the motor magnet 456 produces no useful function at this time. The plurality of switch arms 468, 470 and 472 remain in the positions to which they were stepped by the last pulse received by the motor magnet 456 to preserve a cumulative total of the number of discrete pulses received from the units cents counting chain 430 under the control of the single energized conductor 442 interconnected with the units cents group 418 in the price multiple board 214 (Fig. 21).

The tens cents counting chain 432 and the units dollars counting chain 434 which are provided with selectively energized conductors 490 and 492, respectively, operate in the same manner described in conjunction with the units cents counting chain 430. A pair of stepping motor magnets 494 and 496 advance stepping switch arms 498, 500, 502, 504, 506 and 508 under the control of the counting chains 432 and 434 in the same manner described above in conjunction with the operation of the motor magnet 456.

Figure 19:
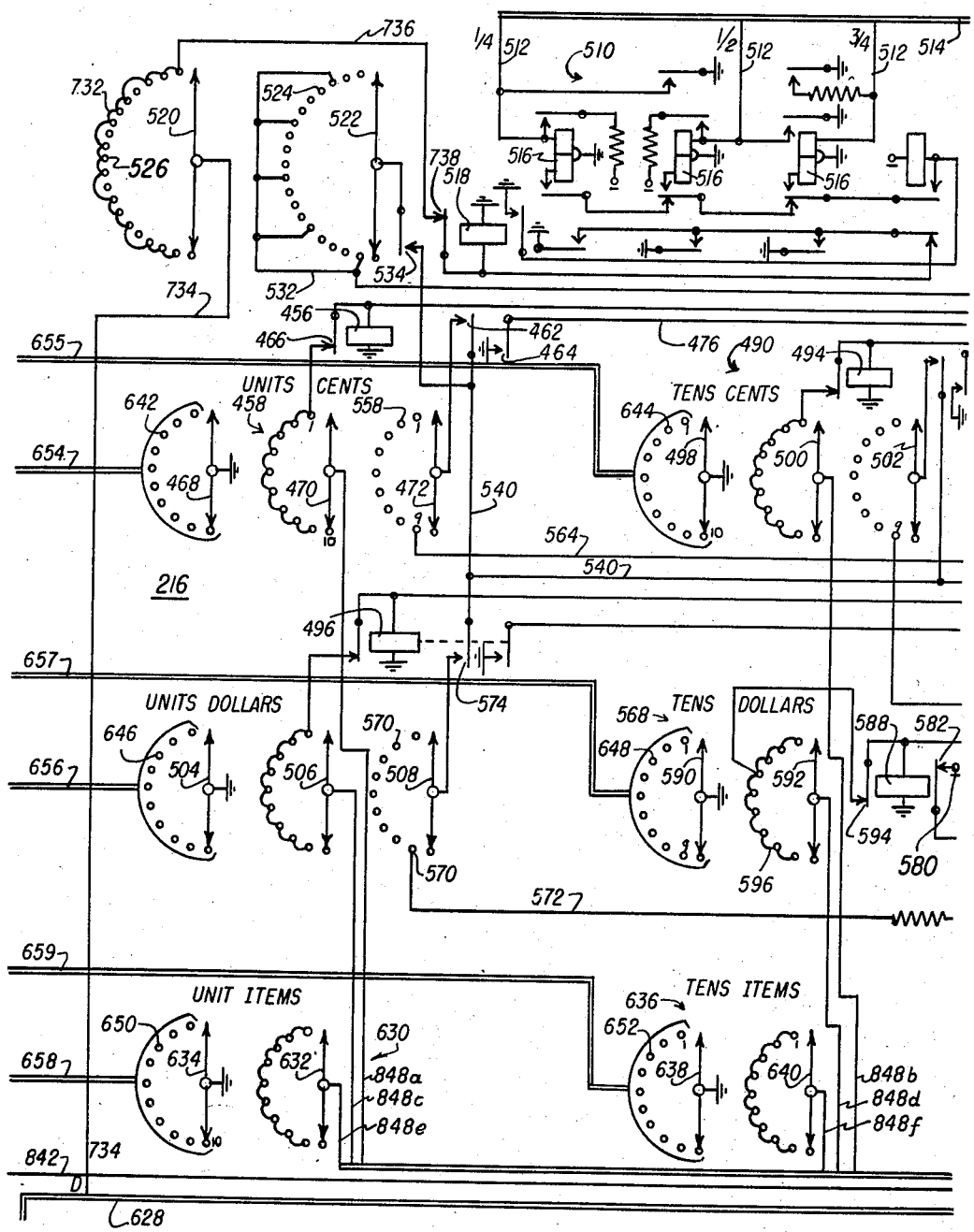
Figure 20:
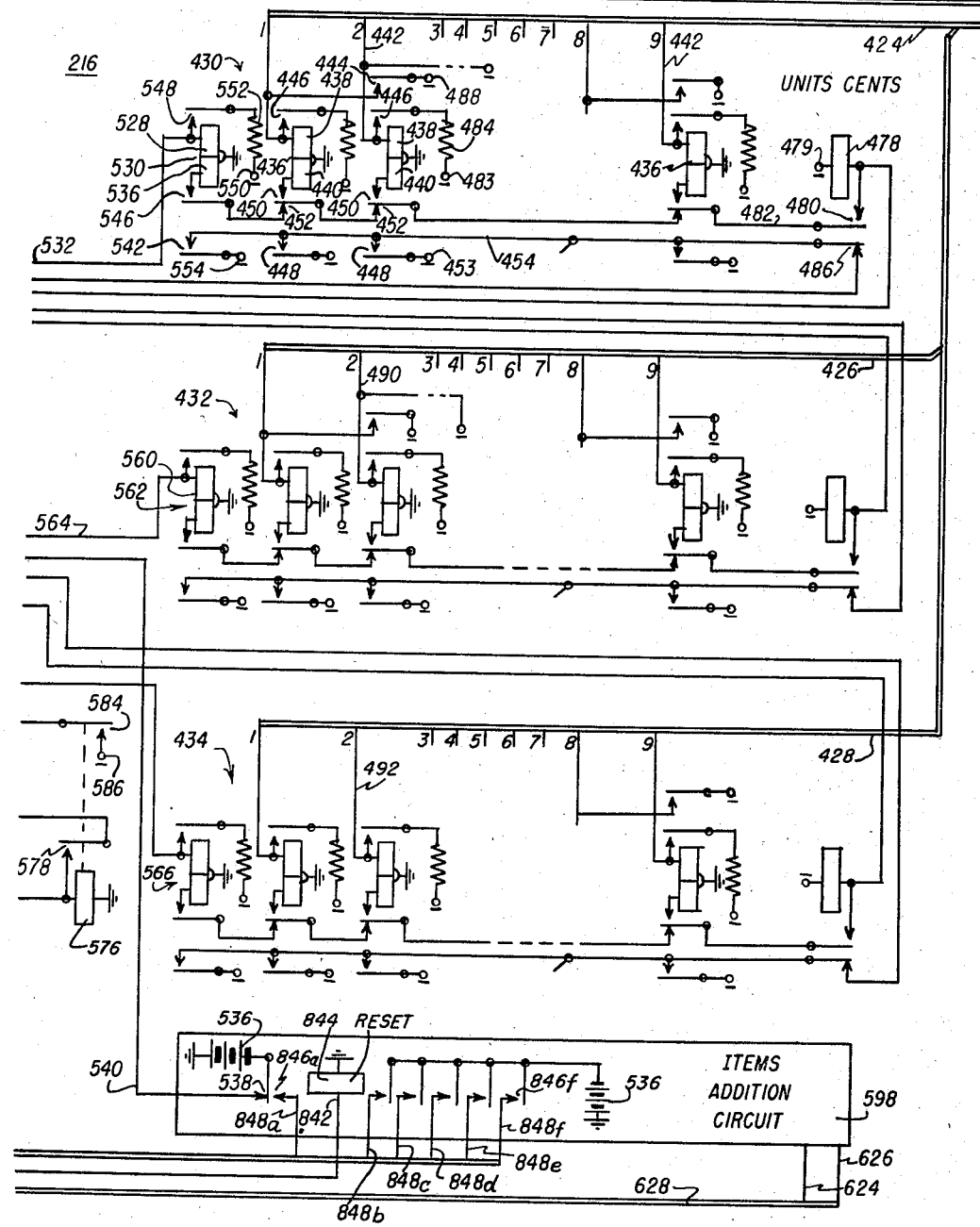

The adding relay circuit 216 also includes a fractional cent counting chain indicated generally as 510 which, as shown in Fig. 19 of the drawings, includes a plurality of conductors 512 which are selectively energized under the control of the price multiple board 214 and which are connected thereto through a cable 514. Although the price multiple board 214 (Fig. 21) is shown as having provision for only a single conductor 106 designated by "½" cent, the counting chain 510 is provided with three conductors 512 designated by "¼," "½" and "¾" cent, and it is obvious that additional conductors could be provided in the units dollars group 422 (Fig. 21) to provide selective energization of the additional "¼" and "¾" cent conductors 512 shown in Fig. 19.

The fractional cent counting circuit 510 includes a plurality of relays 516 which are selectively energized to provide a series of discrete pulses for energizing a motor magnet 518 in the manner described above in conjunction with the units cents counting chain 430. The motor magnet 518 sequentially advances a pair of stepping switch arms 520 and 522 to engage a plurality of contacts 524 and 526 under the control of the successive energizations of the motor magnet 518. The accumulation of a plurality of fractional cents in the fractional cents counting chain 510 produces a series of discrete pulses which advance the switch arm 522 a single step in response to each pulse representing one-quarter cent, and upon the receipt of three such pulses the switch arm 522 is advanced to rest upon the third contact 524 as shown in Fig. 19 of the drawings. This third contact 524 is interconnected with a lockup winding 528 of a fractional cents transfer relay 530 (Fig. 20) through a conductor 532.

Since the arm 522 is moved into contact with the third contact 524 upon removal of the third energizing pulse from the operating winding of the motor magnet 518, and a contact 534 controlled by the magnet 518 is opened, energization is not applied to the third contact 524 from a battery 536 (Fig. 20) through a normally closed contact 538 and a conductor 540.

However, upon receipt of the fourth pulse representing the fourth one-quarter cent or one cent, the motor magnet 518 is energized to close the contact 534 associated therewith and accordingly the battery 536 is connected through the third contact 524 to energize the lockup winding 528 of the transfer relay 530. Operation of the transfer relay 530 closes a plurality of contacts 542, 546 and 548 associated therewith.

The closure of the contact 548 connects a grounded battery at a terminal 550 through a voltage dropping resistor 552 and a closed contact 548 to the lockup winding 528 of the transfer relay 530 and, accordingly, maintains the relay 530 operated when, upon removal of energization of the motor magnet 518, the stepping arm 522 is released and advances to a fourth contact 524. Therefore, although the fractional cents transfer relay 530 is conditioned for energization through the third contact 524 representing three-quarters of a cent, this relay is not energized until the receipt of a fourth pulse representing a complete cent.

Closure of the contact 542 interconnects a battery terminal 554 to the battery conductor 454 to produce an additional discrete pulse for energizing the units cents motor magnet 456 to advance the stepping switch arms 468, 470, and 472 associated therewith an additional step representative of the complete cent transferred to the units cents counting chain 430 from the fractional cents counting chain 510. This additional pulse is produced by the energization of a release winding 536 in the transfer relay 530 under the control of the steering relay 478 through the contact 546 closed by the operation of the fractional cents transfer relay 530.

As shown in Fig. 19 of the drawings, the stepping switch arm 522 cooperates with a large number of associated contacts 524 in which each fourth contact represented by a "¾¢" designation is connected to the transfer relay through the conductor 532. Therefore, the receipt of the fifth discrete pulse from the fractional cents counting chain 510 advances the stepping arm 522 to a fifth contact 524 and this sequential operation is continued in the same manner described above under the control of the fractional cents counting chain 510.

The units cents motor magnet 456 also includes means for transferring a single pulse to the tens units counting chain 432 upon receipt of ten discrete pulses representing ten units cents. The stepping switch arm 472 which is sequentially advanced to engage a plurality of contacts 558 interconnects the transfer battery conductor 540 with a lockup winding 560 of a units cents transfer relay 562 through the normally open contact 462, switch arm 472, ninth contact 558, and a conductor 564 (Figs. 19 and 20). The conductor 564 interconnects a ninth contact 558 with the lockup winding 560 so that upon termination of the ninth discrete pulse received by the motor magnet 456, the stepping arm 472 is moved into engagement with the ninth contact 558. Upon receipt of the tenth pulse, representing ten units cents or one tens cents, the motor magnet 456 closes the contact 462 to energize the lockup winding 560 of the transfer relay 562. The units cents transfer relay 562 operates in the same manner described above in conjunction with the operation of the fractional cents transfer relay 530 to provide an additional discrete pulse for the motor magnet 494 representative of the fact that ten units cents have been counted by the units counting chain 430.

The tens cents motor magnet 494 selectively operates a tens cents transfer relay 566 through the stepping arm 502 in the same manner as the units cents motor magnet 456 to provide an indication in the units dollars counting chain 434 that ten pulses representative of ten cents have been produced by the tens cents counting circuit 432 and received by the tens cents motor magnet 494.

Although a tens dollars counting chain is not provided in the adding relay circuit 216, there is provided a circuit indicated generally as 568 (Fig. 19) for totaling tens of dollars under the control of the units dollars counting chain 434 and the motor magnet 496 associated therewith. The tens dollars order total circuit 568 is interconnected with a ninth contact 570 through a conductor 572 so that upon termination of the ninth discrete pulse received by the units dollars motor magnet 496, the switch arm 508 is moved into engagement with the ninth contact 570. Upon receipt of the tenth discrete pulse by the motor magnet 496, a contact 574 is closed thereby to connect battery conductor 540 to a relay 576 (Fig. 20) through switch arm 508, ninth contact 570, and conductor 572.

Operation of the relay 576 closes a contact 578 associated therewith to provide an instantaneous locking circuit for the relay 576 from grounded battery at a terminal 580 through a normally closed contact 582 and the closed contact 578. This locking circuit for the relay 576 holds this relay operated until a tens dollars motor magnet 588 is energized.

Operation of the relay 576 also closes a normally open contact 584 to connect grounded battery at a terminal 586 to the operating winding of the tens dollars motor magnet 588. Operation of the tens dollars motor magnet 588 conditions a pair of switch arms 590 and 592 to advance a single step upon deenergization of the motor magnet 588. Operation of the relay 588 also opens a contact 594 and the contact 582.

Opening the contact 582 removes battery from the operating winding of the relay 576, energization previously having been removed from the conductor 572 by the advance of the switch arm 508 to the tenth contact 570 so that relay 576 is released to open the contacts 578 and 584. Opening the contact 584 removes the energization from the motor magnet 588 to close the contacts 582 and 594 to condition the motor magnet 588 for operation under the control of the next pulse provided by the engagement of the switch arm 508 with the ninth contact 570. Opening the contact 594 upon energization of the motor magnet 594 prevents energization of a reset winding 596 when the contact 584 is closed to energize the operating winding of the motor magnet 588.

Figure 23:
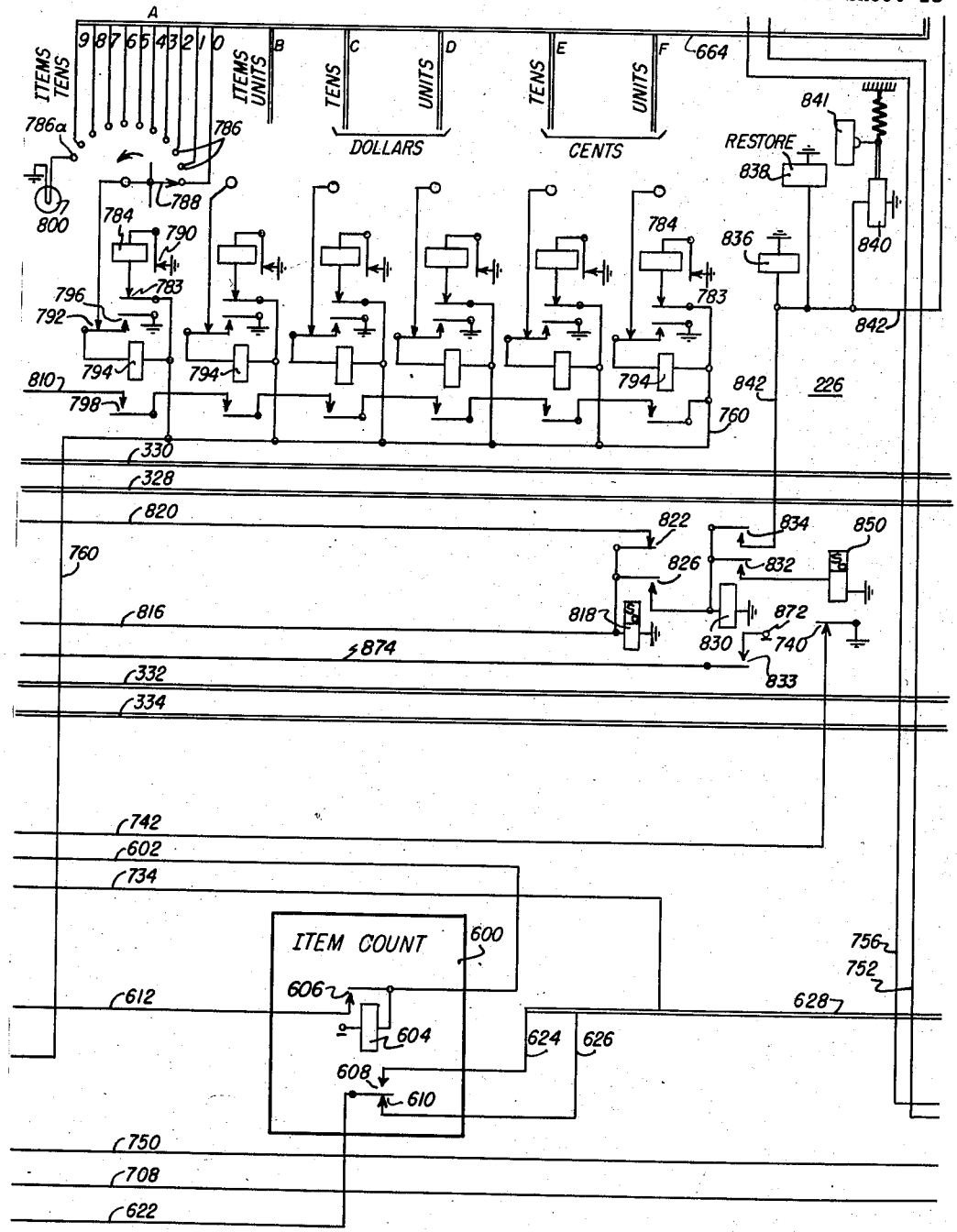

The adding relay circuit 216 is provided with an items addition circuit 598 which is controlled by an item counting circuit indicated generally as 600 in Fig. 23. The item addition circuit 598 is energized in accordance with the number of articles dispensed by a single permutation of perforations in the control tape 37.

The item counting circuit 600 is controlled by a brush 51a (Fig. 17) which is adapted to contact the grounded plate 48 through a perforation in the tape 37. The particular perforation through which the brush 51a engages the ground plate 48 is representative of a predetermined number of articles other than one. For instance, a perforation so positioned in the tape 37 as to ground brush 51a could represent a single compartment in the chutes which contained three articles dispensed in response to the sensing of a single numerical designation. The ground provided on the brush 51a is transmitted through the cable 236 (Figs. 17 and 22) and a conductor 602 (Figs. 22 and 23) to the operating winding of an item counting relay 604. Operation of the relay 604 in response to grounding the brush 51a closes a plurality of contacts 606 and 608 and opens a normally closed contact 610. The closure of the contact 606 provides a holding circuit for the relay 604 by interconnecting grounded and operated contact 290 (Fig. 22) with the operating winding of the relay 604 through a conductor 612 (Figs. 22 and 23).

Referring back to the control circuit 204 (Fig. 22), the closure of the contact 310 grounds the operating winding of a relay 614 to close a pair of contacts 616 and 618 controlled thereby. The closure of the contact 618 connects a grounded battery at a terminal 620 through a conductor 622 (Figs. 22 and 23), either of the contacts 608 and 610, the conductors 624 or 626, and the cable 628 (Figs. 23, 24, 19, and 20) to the items addition circuit 598.

If the item count relay 604 is not energized under the control of the brush 51a, the normally closed contact 610 interconnects battery with the conductor 626 so as to energize a single relay in a counting chain in the items addition circuit 598 similar to the "1" designated relays in the units cents counting circuit 430 or tens cents counting circuit 432. However, if the item count relay 604 is energized in response to a perforation indicating the presence of a plurality of items within a single compartment in the chutes, the operated contact 608 connects battery to the conductor 624 which is connected to a relay in the items addition circuit 598 similar to any of the relays in the counting chains 430, 432 or 434 having a numerical designation equal to the number of articles in the single compartment of the chute.

The selective energization of the items addition circuit 598 (Fig. 20) under the control of the item counting circuit 600 produces a series of discrete pulses equal in number to the number of articles dispensed, and these pulses sequentially step a motor magnet (not shown) in a units items order total circuit indicated generally as 630 (Fig. 19). The sequential energization of the motor magnet in the order total circuit 630 advances a pair of stepping switch arms 632 and 634 into positions representative of the total number of discrete pulses received and, accordingly, of the total number of items dispensed. A tens items counting circuit indicated generally as 636 includes a motor magnet similar to the motor magnet 588 in the tens dollars order total circuit 568 which is sequentially energized to advance a pair of stepping switch arms 638 and 640 in accordance with discrete pulses representing ten units items pulses produced by the motor magnet in the units items order total circuit 630. The exact details of the items addition circuit 598, the units items order total circuit 630, and the tens items order total circuit 636 have not been shown inasmuch as they are similar to equipment and circuits described and shown in detail in Figs. 19 and 20.

Figure 18:
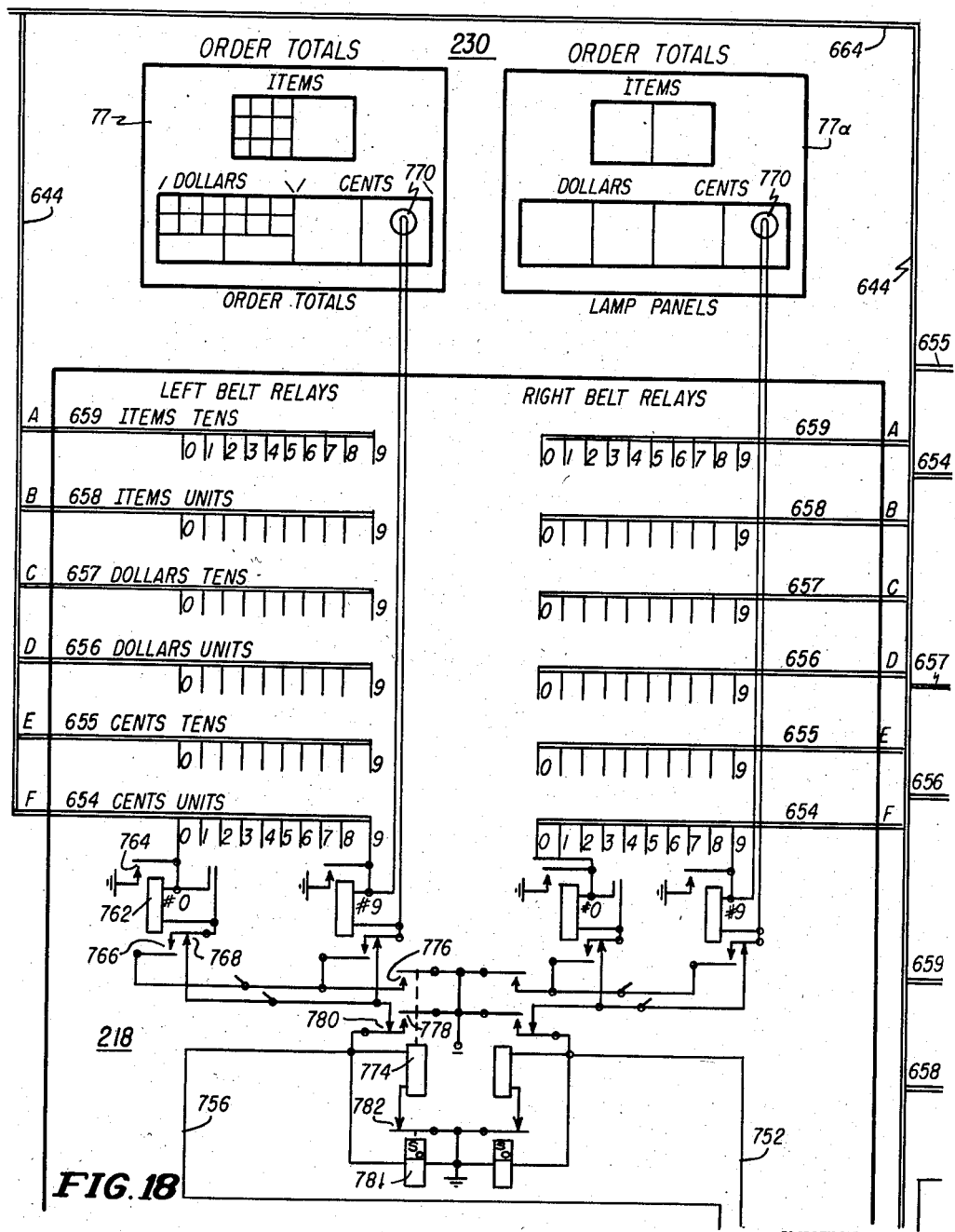

The adding relay circuit 216 provides a cumulative total of the cost of the articles dispensed and the number of articles dispensed by positioning the plurality of stepping switch arms 468, 498, 504, 590, 634, and 638 in accordance with this desired information. These arms contact one of a plurality of contacts 642, 644, 646, 648, 650 and 652, respectively in accordance with the numerical or digital designation of the cumulative total of article cost or article number in the respective denominational columns represented by the motor magnet controlling each of the aforementioned switch arms. Each of the contacts 642, 644, 646, 648, 650 and 652 is connected to the order total relay circuit 218, the recording machine 232, and the printing control circuit 226 by a plurality of conductors forming a plurality of cables 654, 655, 656, 657, 658, and 659, respectively. Since the switch arms 468, 498, 504, 590, 634, and 638 are all connected to ground, a single conductor in each of the cables 654 to 659, inclusive, is grounded in accordance with the numerical designation of the cost of the articles dispensed and the number of the items dispensed in their respective denominational columns. For convenience, the cables 654 to 659, inclusive, are combined to form a single cable 664 (Figs. 17, 18, and 23).

Referring back to the control circuit 204 (Fig. 22), the closure of the contact 616 simultaneously with the closure of the contact 618 to energize the item counting circuit 600 energizes the operating winding of a battery removal relay 666 through a circuit from grounded battery at a terminal 668 to a grounded contact 670. Operation of the relay 666 closes a grounded contact 672 and a contact 674, and opens a contact 676 following the closure of the contact 674.

Opening the contact 676 removes energization from the battery conductor 251 by interrupting the connection between the conductors 251 and 252. Removal of the energization from the battery conductor 251 releases all of the plurality of relays in the decoding circuit 202, the hundreds chute selection circuit 206, the units chute selection circuit 208, the hundreds price selection circuit 210, the units price selection circuit 212, the price relay circuit 211, the chute operating solenoids 356, and the plurality of relays 272, 298, 241, and 614 in the control circuit 204 whereby the operating system is conditioned for operation under the control of a second permutation of perforations in the tape 37.

However, the release of the relay 614 to open the contact 616 does not release the battery removal relay 666 inasmuch as the operating winding thereof is energized from battery terminal 248 through the conductor 252 and the closed contact 674.

Closure of the contact 672 upon operation of the relay 666 energizes a slow-to-operate relay 678 to open the contact 670 associated therewith. Opening the contact 670 releases the relay 666 so that the battery 676 is again closed to apply battery to the battery conductor 251 so that the plurality of circuits in the operating system are again provided with battery and conditioned for operation under the control of another series of perforations in the tape 37. Since the relay 678 is slow in operating, a sufficient time interval is provided for the plurality of deenergized relays to be released and conditioned for operation under a subsequent application of energization.

The release of the relay 666 also opens the contacts 672 and 674 to release the relay 678 and, consequently, to close the contact 670 to condition this portion of the control circuit 204 for another cycle of operation.

Although the plurality of relays in the operating system are deenergized and, accordingly, released upon interruption of the energization provided to the battery conductor 251, the position of the plurality of stepping switch arms associated with the motor magnets in the adding relay circuits 216 are not affected so that these arms retain the cumulative total set thereon under the control of the first series of perforations in the control tape 37.

In order to prevent operation of the plurality of circuits comprising the operating means for the selecting and price adding systems under the control of a group of perforations in the control tape 37 which represent an article originally selected but later cancelled, a brush 51b (Fig. 17) is provided. When a customer punches a permutation of perforations in the control tape representative of a particular article and later decides that he does not wish the article represented by this group of perforations, the order desk punches out the printed price thereof to provide a hole 40a (Fig. 6) in the control tape 37 adjacent the printing representative thereof. This perforation is positioned so as to be in alignment with the brush 51b so that when such an aperture passes thereover ground is applied through the cable 236 (Figs. 17 and 22) and a conductor 682 to the operating winding of a punch-out relay 684.

This application of ground to the operating winding of the relay 684 operates this relay to open a contact 686 controlled thereby. Opening contact 686 removes the grounded battery connected to the battery terminal 248 from the battery conductor 251 and prevents energization of any of the relays in the decoding circuit 202 or circuits controlled thereby.

The relay 684 is operated before the application of ground to the plurality of relays in the decoding circuit 202, since the brush 51b is positioned in the order machine 46 ahead of the brushes 51 controlled by the perforations in the tape 37 which are representative of the numerical code of the cancelled article. Therefore, effective operation of the decoding circuit 202 is prevented.

Since the relay 684 is slow-to-release, the contact 686 remains open for a long enough period of time so that the drive roller 60 has moved the cancelled group of perforations in the tape 37 out of a position interposed between the plurality of brushes 51 and the grounded plate 48. Therefore, upon release of the relay 684, battery is again applied to the battery conductor 251 and the control circuit 204 to permit operation of the system under the control of the next group of perforations in the tape 37.

Successive pluralities of perforations in the tape 37 are sensed by the brushes 51 to selectively control the operation of the operating system and, in response to each series of perforations sensed, the stepping switch arms 468, 498, 504, 522, 590, 634 and 638 (Fig. 19) are moved into positions corresponding to the total cost of the articles dispensed and the total number thereof. As the end of the tape moves past the sensing brush 51c (Fig. 17), indicating the completion of the selection of the desired number of articles, this brush is grounded by contact with the plate 48 to operate an end-of-list relay 688 through a circuit including the cable 266 (Figs. 17 and 22) and a conductor 690. Operation of the end-of-list relay 688 closes a plurality of contacts 692, 694, 696, 698, and 700.

Immediately following the operation of the end-of-list relay 688 under the control of the brush 51c, the tape 37 is advanced by the drive roll 60 to a position at which it is no longer interposed between the grounded brush 812 (Fig. 17) and the outer surface of the drive roll 60 so that the cover release relay 110 is operated through a circuit comprising grounded brush 812, drive roll 60, brush 814 and the energized winding of the solenoid 110. Operation of the solenoid 110 disengages the latch and catch members 56 and 57 (Fig. 8) so that the compression springs 55 move the upper housing of the order machine 46 out of engagement with all of the brushes 51. At such time as the housing member is moved upwardly under the control of the springs 55, the trailing end of the tape 37 is positioned beneath the plurality of type wheels 68 in the printer 47 (Fig. 7). This upward movement of the housing opens the switch 62 to stop rotation of the drive roller 60 and also closes the switch 61 so that the printer 47 is conditioned for energization and operation under the control of the printing control circuit 226.

Baffle motor control circuit

The function of the baffle motor control circuit 222 (Fig. 24) is to energize the motor 98 (Fig. 25) to rotate the baffle 24 (Figs. 12 and 24) for the purpose of discharging the selected goods therein on to either of the plurality of conveying belts 22. The baffle control circuit 222 is controlled by the operation of the end-of-list relay 688 in the control circuit 204 and, in addition to initiating operation of the motor 98, also conditions the order total relay circuit 218 to energize either of a pair of visible display means in the lamp panel 230 in accordance with the selection of the conveyor on to which the articles contained by the baffle 24 are dispensed.

Closure of contact 692 (Fig. 22) upon operation of the end-of-list relay 688 interconnects a grounded battery at terminal 702 with one side of the operating windings of a start relay 704 and a stop relay 706 through a conductor 708 (Figs. 22, 23 and 24).

The start relay 704 and the stop relay 706 are mechanically linked to a control device 710 which functions to reverse the direction of movement of the baffle drive motor 98 in response to each successive start and stop cycle so that, assuming the baffle to be in the position shown in Fig. 24 of the drawings, the energization of one side of the operating windings of the relays 704 and 706 produces only an operation of the start relay 704, the operating winding of which is connected to ground through a contact 712. Operation of the start relay 704 actuates the control device 710 to start the motor 98 rotating the baffle 24 in a clockwise direction.

The energization applied to the conductor 708 is also connected to the grounded operating winding of a relay 714 which is slow-to-operate.

The clockwise rotation of the baffle 24 opens the switch 100a (Figs. 12 and 24) and, in continuing to rotate, closes a switch 100. By the time the switch 100 has closed, the slow-to-operate relay 714 has operated to ground a contact 720 so that upon closure of the switch 100, ground is applied to the operating winding of the stop relay 706 through the closed contact 720 and a pair of conductors 722 and 724. The operation of the relay 714, in addition to providing ground for operating the stop relay 706, also removes ground from the start relay 704 so that operation of the stop relay 706 actuates the control device 710 to stop rotation of the motor 98. The device 710 is now conditioned to operate the motor 98 in a counterclockwise direction when the start relay 704 is next energized.

Figure 5:
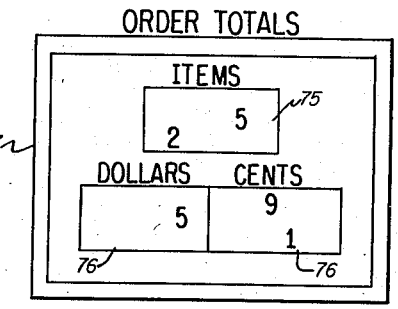
Fig. 5 is a front view of one of the order total lamp panels.

The clockwise rotation of the baffle 24 also rotates a switch arm 726 secured thereto into engagement with a contact 728. The closure of the contact 728 conditions the order total circuit 218 for energizing a selected one of a pair of lamp panels 77 (Fig. 5) in the order total lamp panel 230 in accordance with the conveying means to which the selected and dispensed articles were discharged by the clockwise rotation of the baffle 24.

Referring back to the operation of the end-of-list relay 688, closure of the contact 700 (Fig. 22) interconnects grounded battery at a terminal 730 with a reset winding 732 (Fig. 19) associated with the fractional cents motor magnet 518 through a conductor 734 (Figs. 22 and 23), the cable 628 (Figs. 23, 24, and 19), and the stepping switch arm 520. If the switch arm 520 is in engagement with one of the contacts 526 interconnected with the reset coil 732, the battery is applied from the switch arm 520 through the coil 732, a conductor 736, and a normally closed contact 738 to the operating winding of the motor magnet 518. This energizes the motor magnet to advance the stepping switch arms 520 and 522 to the next contacts 526 and 524, respectively.

Operation of the motor magnet 518 also opens the self interrupting contact 738 so that the motor magnet 518 is sequentially energized and deenergized to step the switch arms 520 and 522 progressively along the contacts 524 and 526 until a contact 526 is engaged by the arm 520 which is not connected to the reset coil 732. At this time, the motor magnet 518 is stopped and the arms 520 and 522 rest on contacts 526 and 524 designated by a units cents digit. Therefore, the energization of the motor magnet 518 under the control of the end-of-list relay 688 sequentially advances the stepping arm 522 to rest upon contact 524 designated by an even cent and in doing so transfers a pulse representative of a full cent to the fractional cent transfer relay 530 so that any fractional cents appearing in the total of the cost of articles purchased are carried as a full cent to the units cents counting chain 430 upon completion of the sensing of the tape 37.

Closure of the contact 698 (Fig. 22) upon operation of the end-of-list relay 688 closes a holding circuit to the operating winding thereof from a grounded normally closed contact 740 through a conductor 742 (Figs. 22 and 23).

Closure of contact 696 applies ground to the operating winding of the punch-out relay 684 to operate this relay and remove battery from the plurality of relays in the operating circuit by opening the contact 686. Removal of the battery from the battery conductor 251 insures the release of all of the relays in the operating system although such relays should be released at this time in response to the operation of the battery removal relay 666 to complete the sensing of the last group of perforations in the tape 37.

Closure of the contact 694 energizes a final relay 744 which is slow-to-operate and accordingly provides enough time delay for the above described functions to be completed following the energization of the end-of-list relay 688 and prior to the operation of the final relay 744 to close a pair of contacts 746 and 748 controlled thereby. Closure of the contact 748 energizes a conductor 750 (Figs. 22, 23, and 24) and the energization applied thereto is connected to the order total relay circuit 218 through the engaged switch arm 726, the contact 728, and a conductor 752 (Figs. 24, 23, and 18). A contact 754 is connected to the order total relay circuit 218 through a conductor 756 (Figs. 24, 23, and 18).

Closure of the contact 746 connects a grounded battery at a battery terminal 758 to the printing control circuit 226 (Fig. 23) through a conductor 760 (Figs. 22 and 23).

Order total relay circuit and light panel

The order total light panel 230 (Fig. 18) provides a visible indication of a predetermined duration of the total cost of the articles dispensed and the number thereof under the control of the order total circuit 218 and adding relay circuit 216 upon energization by the operation of the final relay 744 (Fig. 22) in the control circuit 204. The order total relay circuit 218 includes a plurality of relays 762 which have one side of the operating windings thereof interconnected with one of the contacts associated with the stepping switches in the adding relay circuit 216 through the plurality of cables 654 to 659, inclusive. The relays 762 are designated by one of the digits "1" to "9," inclusive, and "0," and are interconnected with contacts in the adding relay circuit 216 having a like designation so that, when one of the contacts 642, 644, 646, 648, 650 or 652 (Fig. 19) is grounded under the control of the motor magnet associated therewith, the operating winding of a like designated relay 762 in the proper denominational group is grounded.

This grounded relay is operated by the battery applied to one of the conductors 752 or 756 in accordance with the position of the baffle switch arm 726. As shown in Figs. 24 and 18, the conductor 756 is energized so that the left hand portion of the order total panel 230 is rendered operative by the application of battery to the conductor 756. Application of the battery to conductor 756 operates the relays 762 provided with ground under the control of the adding relay circuit 216 and operates these relays to close a plurality of contacts 764 and 766 and to open a plurality of contacts 768. Simultaneously with operating the grounded relays 762 the application of battery to the conductor 756 also energizes selected electric lamps 770 through a pair of conductors 722 connected in parallel with the operating winding of the particular grounded relays 762. The energized lamps 770 are positioned behind translucent plates having numerical indicia thereon corresponding to the digital designation of both the operated relays 762 and the grounded contact in the adding relay circuit 216 so that illumination of the selected lamps 770 produces a visible indication of the number of articles dispensed and the total cost thereof.

Closure of the contacts 764 provides ground to the operated relays 762 to form a holding circuit therefor so that the selected and operated relays 762 remain operated even though ground is subsequently removed under the control of the adding relay circuit 216.

The application of battery to the conductor 756 also operates a battery relay 774 to close a pair of contacts 776, 778 and to open a contact 780. Closure of the contact 778 connects battery to the operating winding of the battery relay 774 to provide a holding circuit therefor so that opening the contact 780 does not release this relay.

Closure of the contact 776 connects battery to the operated relays 762 through the closed contacts 766 associated therewith and maintains the selected relays 762 operated even though the contacts 768 are opened by the operation of this relay.

Since a single relay 762 is operated in each of the groups of these relays representing units cents, tens cents, units dollars, tens dollars, units items and tens items, lamps 770 in the display panel 77 will be lighted to provide a visible indication of the total cost of the articles dispensed in dollars and cents and the total number of items so dispensed. This display remains lighted for a predetermined interval, i.e., approximately nine seconds, and is terminated by the operation of a slow-to-operate relay 781, one side of the operating winding of which is grounded and the other side of which is energized by the closure of the contact 778. Operation of the relay 781 opens a contact 782 to remove ground from the battery relay 774 so that the contacts 776 and 778 are opened and the contact 780 is closed. Removal of the battery by opening contact 776 removes battery from the operated relays 762 in each of the tens items, units items, tens dollars, units dollars, tens cents, and units cents groups so that these relays are released to close the contacts 768 and open the contacts 764 and 766. Opening the contacts 776 also removes the energization from the selected lamps 770 so that the visible indication of the price and item totals is removed.

Opening the contact 778 upon the release of the relay 774 removes energization from the operated time delay relay 781 to condition the order total relay circuit 218 for another operation similar to that described but under the control of the conductor 752.

Since the baffle 24 is rotated to dispense the next following group of articles on to the second of the pair of conveying means 22, the accompanying movement of the baffle switch arm 726 closes the contact 728 to permit energization of the conductor 752. The conductor 752 energizes an order total lamp panel control circuit, as shown in the right hand portion of Fig. 18, which is identical to that controlled by the conductor 756 and produces a visible indication in a lamp panel 77a representative of the total number of items and cost thereof dispensed on to the second conveying means. Accordingly, the two lamp panel control circuits which are identical are alternately energized to provide visible displays in accordance with the alternate movements of the baffle 24 to dispense selected articles on to either of the pair of conveying means.

*Printing control circuit*

The printing control circuit 226 (Fig. 23) is controlled by the adding relay circuit 216 to move a plurality of printing means in the printer 47 into predetermined positions representative of the totals provided by the adding relay circuit 216, and is energized to accomplish this function under the control of the circuit 204. Closure of the contact 746, upon operation of the final relay 744 in the control circuit 204, connects battery to the printing control circuit 226 through the conductor 760. This battery is applied to a plurality of normally closed contacts 783 of a plurality of self interrupting stepping relays 784.

The printing control circuit 226 includes a plurality of stepping relays 784 in accordance with the number of denominational columns in which a digit is to be printed by the printer 47. Each of the relays 784, representing one of the tens items, units items, tens dollars, units dollars, tens cents, or units cents groups, is provided with a plurality of digitally designated contacts 786 which are interconnected with like designated contacts in the adding relay circuit 216 through the plurality of cables 654 to 659, inclusive. The application of battery to the contact 783 energizes each of the relays 784 to advance a stepping switch arm 788 associated therewith to engage a contact 786 designated by the next highest digit. Operation of the relay 784 also opens an interrupting contact 790 to break the energizing circuit for this relay so that each of the relays 784 is released to re-establish the energizing circuit therefor and advance the stepping switch arm 788 to the next highest digit.

This cycle of operation is continued until each of the stepping switch arms 788 engages a contact 786 which is connected to ground through the adding relay circuit 216. At this time, ground is connected through the switch arm 788 and a contact 792 to operate a relay 794 associated with each of the stepping relays 784. Operation of the relays 794 closes a plurality of contacts 796 and 798 and opens the contact 783. Closure of the contacts 796 connect ground to the operating windings of the plurality of relays 794 and holds these relays operated in the event that ground is removed by the adding relay circuit 216.

Accordingly, each of the stepping switches 784 moves the switch arm 788 associated therewith into a position representative of the order totals provided by the plurality of stepping relays in the adding relay circuit 216 and is locked in this position by the removal of battery from the stepping relays 784 by opening contact 783. An eleventh contact 786a is provided on the contact banks of each of the relays 784, and this contact is connected to an electric lamp 800, one side of which is provided with battery so that a visible indication is provided in the event that any of the stepping relays 784 advance their associated switch arm past all of the contacts 786 without stopping to register on the grounded contact 786 representative of the digit in the total to be printed.

The operation of the plurality of stepping relays 784 to move the plurality of switch arms 788 associated therewith into positions representative of the totals to be printed moves the plurality of printing or type wheels 68 (Figs. 7 and 17) into positions corresponding to the positions of the plurality of switch arms 788. Each of the switch arms 788 (Fig. 17) is mechanically linked with one of the plurality of type wheels 68 by a flexible cable 804, each end of which is spring loaded by a pair of springs 806. As the switch arms 788 move over successive contacts 786 to seek a grounded contact 786 upon which the switch arms 788 come to rest, the flexible cables 804 are moved under the action of the springs 806 and arms 788 to rotate the type wheels 68 into positions corresponding to the digital designation of the contacts 786 upon which the switch arms 788 are positioned. Although only one type wheel 68 is shown in Fig. 17 of the drawings, a single type wheel 68 is provided for each of the stepping relays 784, and these type wheels may be arranged as shown in Fig. 7 of the drawings, so that the four type wheels 68 shown on the right in Fig. 7 print the total cost of the articles dispensed and the two type wheels 68 shown to the left print the total number of articles dispensed.

When all of the stepping switches 784 are moved to their proper positions representing the cost of articles dispensed and the total number of items dispensed, all of the plurality of relays 794 are operated to close the plurality of contacts 798 associated therewith. These contacts interconnect the energized conductor 760 with a conductor 810 (Figs. 22 and 23) which forms a part of the cable 266 (Figs. 22 and 17). The conductor 810 is also connected to the switch 61.

The switch 61, which was opened by the movement of the grounding plate 48 in a downward direction to initiate operation of the operating circuit for the dispensing system, is now closed by the previous operation of relay 110 (Figs. 8 and 17) immediately following the operation of the end-of-the-list relay 688. Since the switch 61 is closed, energization is applied from the conductor 810 to a conductor 816 which forms a portion of the cable 266 (Figs. 17 and 22). The conductor 816 (Fig. 23) is connected to the operating winding of a slow-to-operate relay 818, one side of which is grounded.

The energized conductor 816 is also connected to a conductor 820 through a normally closed contact 822. The conductor 820 passes through the cable 266 (Figs. 22 and 17) to one side of a grounded operated winding of the printing solenoid 69 (Figs. 7 and 17). The solenoid 69 is operated by the application of battery to the conductor 820 and moves the plurality of pre-set type wheels 68 into engagement with the end of the control tape 37 to produce an indication of the total number of items dispensed and the cost thereof as shown at 73 and 72 in Fig. 6 of the drawings. The lamp 71 which is paralleled across the operating winding of the relay 69 produces a visible indication of the fact that the type wheels 68 have been moved into engagement with the end of the control tape 37.

Accordingly, the printing control circuit 226 prevents energization of the printing relay 69 to produce a faulty indication of the total number of items dispensed and the cost thereof inasmuch as each of the plurality of stepping relays 784 must be moved into a proper position prior to the application of battery to the printing solenoid 69. Also, since the end of the tape 37 must be moved from its interposed position between the brush 812 and the feed roller 60 in order to close the contacts of switch 61, the printing control circuit 226 insures that the proper portion of the tape 37 is in printing position beneath the plurality of axially arranged type wheels 68.

The application of battery to the slow-to-operate relay 818 (Fig. 23) does not operate this relay until such time as the printing solenoid 69 is actuated to produce a printed record of the cost of articles dispensed and the number thereof. However, at this time, the relay 818 is operated to open the contact 822, thus releasing the printing solenoid 69, and to close a contact 826. Closure of the contact 826 interconnects the energized conductor 816 with the operating winding of a relay 830.

Operation of the relay 830 closes the contacts 832, 833 and 834 associated therewith. Closure of the contact 834 interconnects the energized conductor 816 with the grounded operating windings of a plurality of relays 836, 838, and 840. Energization of the operating winding of the relay 836 operates this relay to advance the ink ribbon in the printer 47. Operation of the relay 838 restores all of the plurality of stepping solenoids 784 to a normal position with the switch arms 788 engaging the contact 786 designated by a "0."

Operation of the relay 840 closes a spring loaded switch 841 to energize the motor 80 (Fig. 7) to advance the tape 78 having thereon a ribbon copy of the printed totals of the cost of the articles and number of items dispensed.

The closure of the contact 834 also interconnects the conductor 816 with and energizes a conductor 842 (Figs. 23, 18, 19, and 20). Energization of the conductor 842 operates a reset relay 844 to open the contact 538 and close a plurality of contacts 846 a—f so that the battery 536 is connected to a plurality of reset battery conductors 848 a—f. The reset battery conductors are connected to the plurality of switch arms 470, 500, 506, 592, 632, and 640 (Fig. 19) so that the motor magnets 456, 494, 496, 588, and the motor magnets associated with the units items circuit 630, and the tens items circuit 636 are energized through self interrupting contacts similar to the contact 466. The energization of the plurality of motor magnets advances the plurality of switching arms associated therewith to a normal or home position with the switch arms in engagement with a contact designated by "0." Accordingly, the application of battery to the plurality of reset switch arms resets the plurality of stepping relays in the adding relay circuit 216 to a normal or home position, and, accordingly, the circuit 216 is conditioned for operation under the control of a second tape 37.

The closure of the contact 832 (Fig. 23) energizes the operating winding of a slow-to-operate relay 850. This relay operates after a predetermined interval of time sufficient for all of the stepping relays to be reset and opens the contact 740. Opening the contact 740 removes ground from the operating windings of the punch-out relay 684 and the end-of-list relay 688 (Fig. 22) so that these relays, in releasing, open the plurality of contacts associated therewith to remove battery from that portion of the operating system which they control so that all of the relays therein are released and conditioned for operation under the control of the next tape 37. The release of relay 684 closes battery contact 686 so that battery is applied to the control circuit 204 to condition this circuit for operation under the control of the next tape 37.

*Recording machine*

The recording machine 232 (Fig. 17) provides a cumulative total of the total number of items dispensed and the cost thereof which is not removed or cleared by the operation and release of the end-of-list relay 688. To accomplish this, the recording machine 232 is interconnected with the adding relay circuit 216 through the cable 644 and includes a plurality of solenoids 852, each of which is designated by a digit corresponding to that of the contact to which it is connected by the plurality of cables 654 to 659, inclusive.

One side of the operating winding of a single solenoid 852 in each of the various groups, i.e., units cents, tens cents, units dollars, tens dollars, units items and tens items is grounded under the control of the adding relay circuit 216. The other side of the windings of all of the solenoids 852 is connected to the battery conductor 820 which is energized as previously described to operate the printing solenoid 69. Therefore, the selectively grounded solenoids 852 are operated concurrently with the operation of the printing solenoid 69 by operation of the slow-to-operate relay 818 (Fig. 23). By delaying the energization of the solenoids 852 until such time as the printing solenoid 69 is energized, the solenoids 852 are not energized as the arms in the stepping relays of the circuit 216 are moved over their associated contacts during the sensing of a particular tape 37. Operation of the selected solenoids 852 depress keys on a pair of conventional adding machines 854 and 856.

In order to actuate the conventional adding machines 854 and 856 following the depression of a selective number of keys thereon, a pair of operating solenoids 870 (Fig. 17) are provided. One side of the operating windings of each of these solenoids is grounded and the other side of the operating windings thereof is connected to grounded battery at a terminal 872 (Fig. 23) through a conductor 874, the cable 266, and the contact 833. Since the contact 833 is closed by the operation of the relay 830 following the energization of the solenoids 852, the adding machines 854 and 856 are not actuated to register the values represented by the operated solenoids 852 until such time as the keys of these adding machines have been depressed. Accordingly, the adding machines 854 and 856 provide a cumulative total of the series of totals provided by the adding relay circuit 216 and are not cleared or reset to zero when ground is removed from the plurality of stepping switch arms in the circuit 216 under the control of the reset relay 844.

In view of the foregoing detailed description, it is believed that the general operation of the article selecting, price adding and assembling system will now be understood.

A control tape 37, which has been provided with a plurality of groups of perforations representative of the numerical designation of the articles to be dispensed, is placed in the order machine 47, and the cover or ground plate 48 is pushed down so that the latches 56 (Fig. 8) engage the catches 57 to hold the ground plate 48 in a depressed condition with the control tape 37 interposed between the lower surface of the ground plate 48 and the plurality of brushes 51. This downward movement of the ground plate 48 opens the switch 61 and closes the switch 62.

Closure of the switch 62 energizes the motor 63 (Fig. 17) to initiate rotation of the drive roller 60. The rotation of the drive roller 60 advances the control tape 37 through the order machine 46 until such time as the first group of perforations are positioned above the staggered brushes 51. Certain of the brushes 51 pass through the perforations in the tape to engage the ground plate 48 and, in response to the grounds, to operate a selected one or plurality of the relays 242 and 284 along with similar relays in the tens decoding circuit 254 and the thousands decoding circuit 258 (Fig. 22). Operation of the plurality of relays in the units, tens, hundreds and thousands decoding circuits operate the plurality of contacts 314, 316 and similarly positioned contacts in the tens and thousands decoding circuits to establish four conductive paths which are subsequently energized under the control of the control circuit 204. Closure of the contacts 278, 282, and 296 under the control of a plurality of relays in the decoding circuit 202 both provide a holding circuit for the plurality of operated relays, and also initiates operation of the first relay 272 in the control circuit 204.

The operation of the relay 272 closes the contacts 286, 288, 290, and 292 controlled thereby to provide a locking circuit for the relay 272 and to connect ground through the closed contact 292 to hold the operated relays in the units decoding circuit 244 and the tens decoding circuit 254 in that condition. The contact 290 in closing connects ground to a contact 606 in the items counting circuit 600 (Fig. 23).

The contact 288, in closing, energizes and operates a delay relay 298 so that the contact 302 controlled thereby is closed to connect ground with the operating winding of the battery relay 240. The relay 240, when operated, removes ground from the plate 48 (Fig. 17) by opening the contact 238 and connects battery to the four conditioned paths in decoding circuit 202 by closing the contact 308. The time delay provided by the sequential operation of the relays 272, 298, and 240 following the operation of the relays in the decoding circuit 202 provides enough time for the plurality of conductive paths repreventative of the numerical designation of the article to be selected to be set up by the decoding circuit 202 so that upon closure of the contact 308 these paths are established and battery is applied to only the desired conductive paths representative of the numerical designation of said selected article.

The closure of the battery contact 308 to energize a selected one of each of the plurality of conductors 320, 322, 324, and 326 provides information in the form of four energized conductors, each representative of a digit in a different denominational column of the numerical designation of the article to be selected. The energized thousands conductor 324 operates a similarly designated relay 336 (Fig. 24) in the hundreds chute selection circuit 206 to condition a plurality of paths so that upon energization of any one of these conditioned paths a predetermined thousands-hundreds chute conditioning relay 342 (Fig. 25) will be operated. The energized hundreds conductor 322 is connected in multiple to all of the contacts 338 in the hundreds chute selection circuit 206 so that this conductor is connected to a thousands-hundreds chute selection relay 342 (Fig. 25) in accordance with the digital designation in the thousands denominational column of the relay 336 operated under the control of the thousands decoding circuit 258.

This selected and energized hundreds conductor 322 is also connected to the grounded operating winding of a thousands-hundreds price selection relay 404 (Fig. 21) through the conductor 408 (Figs. 24, 25, 26, and 21) to operate this relay and condition the price relay circuit 211 for operation only in a selected thousands-hundreds group.

The energized units conductor 320 operates the similarly designated relay 348 in the units chute selection circuit 208 (Fig. 24) to close the plurality of contacts 350 associated therewith. Closure of the contacts 350 interconnects the energized tens conductor 326 from the tens decoding circuit 254 with the chute selection control relay 346 to energize and operate this relay. Since the energized relay 346 is conditioned for operation under the control of the thousands and hundreds digits and energized under the control of the units and tens digits, the operation of any particular relay 346 is representative of the numerical designation of the article to be selected.

Operation of the relay 346 closes the contact 358 associated therewith to energize the chute solenoid 87a or 94a (Figs. 9, 10, 11, and 25) to release the chute gate or barrier 87, 94, 96 so that a selected article is permitted to fall on to the baffle 24.

The energized tens conductor 326 also operates one of the relays 362 or 363 (Fig. 26) in accordance with the odd or even character of the digits in the tens denominational column to close either the contacts 364 and 366 or the contacts 372 and 374. Closure of one of the contacts 364 or 372 energizes one of a plurality of conductors 380 which form the cable 381 interconnecting the units price selection circuit 212 with the price relay circuit 211.

Operation of one of the contacts 366 or 374 energizes either the common odd tens relay 370 or the common even tens relay 376 to close the plurality of contacts 382 or 386, respectively. Closure of either of the groups of contacts 382 or 386 operates one of the relays 384 or 388 in accordance with the selective energization of one of the units conductors 320. One of the relays 384, or 388, when operated in accordance with the odd or even character of the tens digit and in accordance with the energized conductor representative of a particular units digit, closes the plurality of contacts 390 or 398, respectively, to energize the triad of conductors 394 or 402, respectively, which are interconnected with the price relay circuit 211 through the cable 396.

The previous operation of the thousands-hundreds price selection conditioning relay 404 to close the plurality of contacts 412 conditions the plurality of relays 410 for operation in accordance with the selective energization of one of the conductors 380 (Fig. 26) by the odd or even relays 362 and 363. Operation of one of the relays 410 closes the plurality of contacts 414 so that the energized triad of conductors 394 or 402 are interconnected with the adding relay circuit 216 through the price multiple board 214. The particular energized triad of conductors energizes a single conductor 106 in each of the units dollars, tens cents, and units cents conductor groups 422, 420, and 418, respectively.

The energized conductors 106 are interconnected with similarly designated relays in the units cents counting chain 430, the tens cents counting chain 432, and the units dollars counting chain 434 by the cables 424, 426, and 428, respectively. Energization of one of the relays 436 in the counting chain operates this relay to close the plurality of contacts 448, 450, 446, and 444 associated therewith. The closure of the contact 444 energizes the relay 436 designated by the next lowest digit and this sequential energization of the plurality of relays 436 comprising each of the counting chains 430, 432, and 434 continues until such time as all of the relays 436 in each chain, which are designated by digits lower than that indicating the energized conductors 442, 490, and 492 are operated to close the plurality of contacts 448 associated therewith.

Closure of any of the contacts 448 energizes the motor magnets 456, 494, and 496 to condition a plurality of stepping switch arms associated therewith for advancement upon termination of the energization of the motor magnets. Energization of the motor magnets in addition to advancing the stepping switch arms closes grounded contacts associated therewith to operate steering relays 478. Operation of the steering relays energizes the release windings 440 of the first energized relays 436 to release these relays and open the plurality of contacts associated therewith. Operation of the relay 478 interrupts the energization of the motor magnet 456 to permit the stepping arms associated therewith to advance a single step and also opens the contacts controlled by the motor magnets so that the steering relay is released. This sequential operation continues in each of the counting chains 430, 432, and 434 until such time as all of the battery contacts 448 are opened.

At this time, each of the motor magnets 456, 494, and 496 will have advanced the associated stepping arms into positions representative of the digits in the cost of the article selected under the control of the tape 37.

Referring back to the control circuit 204 (Fig. 22), the operation of the time delay relay 614, upon closure of the contact 310, closes the contacts 616 and 618. Closure of the contact 618 energizes the conductor 626 (Fig. 23) through the normally closed contact 610 in the item counting circuit 600. The energization of the conductor 626 is applied to a "1" designated relay 436 in the items addition circuit 598 (Fig. 20) through the cable 628 (Figs. 23, 24, 19, and 20). Operation of the units counting chain in the items addition circuit 598 (Fig. 20), advances the stepping arm 634 to engage a contact 650 designated by the digit "1." Therefore, the plurality of stepping switch arms in the adding relay circuit 216 are moved into positions representative of the cost of the article dispensed by the chutes and also of the total, i.e., one of the number of articles dispensed.

Energization is then removed from the decoding circuit 202 and circuits controlled thereby by the operation of the relay 666 upon closure of the contact 616. Operation of the relay 666 closes the contact 674 and opens the contact 676 to remove energization from the battery conductor 251 and accordingly releases the plurality of relays in the decoding circuit 202, the hundreds chute selection circuit 206, the units chute selection circuit 208, the hundreds price selection circuit 210, the units price selection circuit 212 and the price relay circuit 211.

Closure of the contact 672 operates the slow-to-operate relay 678 to open the contact 670 and thus remove ground from the operating winding of the relay 666 after a predetermined period of time sufficient for all of the relays in the above mentioned circuits to have been released. At this time, the contact 676 is again closed to energize the battery conductor 251 so that the second permutation of holes in the control tape 37 will produce operation of the decoding circuit 202 in the same manner as that described above to select a second article in accordance with the numerical designation thereof and to translate the article selection information into price selection information in the circuits 210, 212 and 211 and 214 and to convert this price information into a series of discrete pulses in the adding relay circuit 216 which are utilized to advance the plurality of stepping switches therein into positions representative of the total cost of both articles dispensed and to positions representative of the fact that two articles have been dispensed.

As successive article costs are totaled by the adding relay circuit 216, the fractional cents transfer relay 530, the units cents transfer relay 562, the tens cents transfer relay 566, and the units dollars transfer relay 576 are energized to transfer a single pulse to the next highest order counting chain under the control of the completion of the counting of the predetermined series by the next lower order counting chain.

In the event that a group of perforations in the tape 37 are sensed representing an article which, though originally selected by the customer, is no longer desired, the brush 51b is energized by the hole 40a (Fig. 6) in the tape 37 to energize the relay 684 (Fig. 22). This relay in operating opens the contact 686 to remove energization from the battery conductor 251 and accordingly prevents operation of the decoding circuit 202 under the control of the group of perforations indicating the cancelled article. The relay 684 remains operated for a long enough period of time so that the drive roller 60 moves the next group of perforations into alignment with the sensing brushes 51. At this time, the decoding circuit 202 is again energized under the control of this subsequent group of perforations to dispense another article and provide control information to the adding relay circuit 216 in accordance with the price and number of the articles dispensed.

In the event that a group of perforations in the tape 37 is moved into position which controls the selection of a chute having a plurality of identical articles in a single compartment thereof, the brush 51a is grounded to operate the item counting relay 604 (Fig. 23). Operation of the relay 604 opens the contact 610 and closes the contact 608 so that, upon operation of the relay 614 to close the contact 618, battery is applied to the items addition circuit 598 through the cable 628 and a conductor 624 (Figs. 23, 24, 19 and 20) connected to a relay similar to the relay 436 which is designated by a digit corresponding to the number of articles in the single compartment of the dispensing chute. Therefore, operation of the item counting relay 604 operates the items addition circuit 598 to produce a series of discrete pulses for energizing the units items counting circuit 630 in accordance with the number, other than one, of articles in a single dispensing compartment in the chutes controlled by the solenoids 87a or 94a.

This above described cycle of operation is repeated in accordance with the number of articles which are to be selected by the system. When the last series of perforations in the tape 37 representing the last desired article passes the brushes 51 and the end of the tape passes the end-of-list brush 51c, the end-of-list relay 688 is operated to close the plurality of contacts 692, 694, 696, 698 and 700 controlled thereby. Following the energization of the end-of-list relay 688, the control tape 37 is moved out of a position interposed between the grounded brush 812 and the drive roller 60 so that the cover release relay 110 (Figs. 8 and 17) is operated to disengage the latches 56 and catches 57, whereupon the ground plate 48 is moved upwardly under the resilient action of the springs 55. This upward movement opens the switch 62 so that energization is removed from the motor 63 to prevent further movement of the tape 37, and also closes the switch 61 to condition the printing solenoid 69 for operation under the control of the final relay 744 in printing control circuit 226.

Closure of the contact 692 energizes the start relay 704 (Fig. 24) to actuate the baffle motor control device 710 so that the baffle motor 98 (Figs. 3, 12 and 25) rotates the baffle 24 to dispense the selected number of items on to one of the conveying means 22. Rotation of the baffle 24 also closes one of the switches 100 or 100a to operate the stop solenoid 706 which, when energized, actuates the control device 710 to stop the motor 98. Simultaneously, with rotating the baffle 24 to close one of the switches 100 or 100a, the switch arm 726 is also moved to close one of the contacts 728 or 754.

Closure of the contact 700 energizes the reset winding 732 (Fig. 19) of the fractional cents counting chain 512 to step the switching arms 520 and 522 to the next contact 524 representative of a complete cent so as to energize the fractional cents transfer relay 530 and thereby to provide an indication of a complete cent by advancing the stepping switch arm 468 to the next highest designated contact 642.

Closure of the contact 694 operates the slow-to-operate final relay 744 so that upon operation thereof following the completion of the remainder of functions provided by the end-of-list relay 688, the contacts 746 and 748 are closed. Closure of the contact 748 energizes either the conductor 752 or the conductor 756 in accordance with the position of the switch arm 726 (Fig. 24) to produce a visible display in the order total light panel 230 (Fig. 18) in accordance with the conveyor 22 on which the baffle 24 dispensed the selected articles. Energization of one of the conductors 752 or 756 operates the relay 762 designated by digits corresponding to those of the contacts in the adding relay circuit 216 to which these relays 762 are connected by one of the plurality of cables 654 to 659, inclusive. The visible display is produced by energizing the electric lamp 770 connected in parallel with the operating winding of the energized relays 762 and this combination of lighted lamps produced by the energization of one of the two conductors 752 and 756 is maintained for a predetermined duration of time under the control of the slow-to-operate relay 781.

Closure of the contact 746 energizes the plurality of printing control circuit stepping relays 784 so that each of these relays operates to advance their associated switch arms 788 into positions in engagement with a contact 786 having a digital designation corresponding to that contact in the adding relay circuit to which these contacts are connected. Movement of the switch arms 788 moves a plurality of type wheels 68 into positions in which the type indicia in printing position corresponds to the digital designation of the contacts 786 with which the switch arm 788 are in engagement.

The plurality of relays 794 in the printing control circuit 226 are energized and operated when the stepping switch arms 788 engages the proper contact 786 and thereby close the plurality of contacts 798. Closure of the plurality of serially connected contacts 798 completes a circuit for energizing the printing solenoid 69 through a circuit including conductor 810, cable 266, closed switch 61, conductor 816, contact 822, and conductor 820. Solenoid 69, when operated, moves the chassis 70 in a downward direction so that the plurality of type wheels 68 print the total cost of the articles dispensed and the number thereof on the trailing end of the control tape 37 and also produce by means of an interposed inked ribbon a like indication on the second roll of tape 78. Concurrently with the energization of the printing solenoid 69, the selected solenoids 852 are operated by the closure of contacts 798.

The energization applied to the printing solenoid 69 is also applied to the operating winding of the relay 818, and after a predetermined period sufficient for actuating the printing solenoid 69, the relay 818 operates to open the contact 822, thus releasing the solenoids 69 and 852, and to close the contact 826. Closure of the contact 826 operates the relay 830 to close the contacts 832, 833, and 834. Closure of the contact 834 energizes a ribbon feed solenoid 836 to advance a new portion of ribbon into printing positions between the control tape 37 and the narrow tape 78. Closing the contact 833 operates the solenoids 870 to actuate the adding machines 854 and 856.

The restoration magnet 838 is also energized by the closure of the contact 834 and operates to release a latch common to all of the stepping switch arms 788 so that the springs 806 (Fig. 17) return all of these arms to a normal position engaging the contact 786 designated by a "0."

The energization applied to the conductor 842 also operates the relay 840 to close the contacts of the switch 841 which controls the energization of the motor 80 (Fig. 7) so that motor 80 is energized to advance the tape 78 provided with the ribbon copy of the totals. This ribbon copy is manually apprehended by the order clerk and given to the customer by the order clerk.

The energization of the conductor 842 also actuates the reset relay 844 to close the contacts 846 and to open the contact 538. The closure of the contacts 846 energizes the plurality of reset windings associated with the plurality of motor magnets in the adding relay circuit 216 and advances all of the stepping arms associated therewith to a position in which the plurality of stepping switch arms engage a contact designated by "0."

The closure of the contact 832 (Fig. 23) energizes the slow-to-operate relay 850 which operates to open the contact 740 after a predetermined period has elapsed which is sufficient for the completion of all of the restoration and resetting operations provided by the energization of the conductor 842. Opening the contact 740 removes ground from the operating winding of the end-of-list relay 688 and, accordingly, releases this relay, the final relay 744, and the battery relay 684 so that the plurality of contacts 692, 694, 696, 698, 700, 746, and 748 are opened to remove energization from all of the relays in the operating system including the relay 840 controlling the operation of the narrow tape feed motor 80. Opening the contact 696 breaks the operating circuit to the slow-to-release relay 684 so that after a predetermined period of time sufficient for all of the relays to release, relay 684 releases to close the contact 686 and thereby to energize the battery conductor 251 to condition the decoding circuit 202 for operation under the control of the next tape 37 placed in the order machine 46.

From the foregoing explanation it will be understood that the present improved system eliminates entirely the handling of merchandise by the customer. It requires a smaller shopping area with complete absence of obstructions. It provides an accurate count of articles purchased. It reduces clerical expense. It eliminates pilferage. As compared with other systems for the same purpose, it eliminates the difficulty of associating a displayed sample with a remotely located apparatus for preparing an order list. It is quiet in operation. Order lists are short in length. It is fast in operation. It reduces the possibility of damage to articles in transit. Heavy and hard articles arrive at the assembly point before light and soft ones. It can handle articles of varying sizes and shapes. It is easy and economical to keep loaded. The dispensing apparatus operates on a low direct current, rather than a heavy current, sometimes A.C. A punched hole code or a printed code on an order list determines the selection of articles and is translated into a predetermined price. Punch plates controlling the preparation of a punched hole code can be easily and readily changed. The equipment for price translation is designed to care for price changes with ease and rapidity. Article display cabinets are not wired and thus may be easily relocated. Dual baffle and twin belt operation increase speed and efficiency of delivery with lower velocity of belts. The electrical operations are regulated and timed by a control circuit consisting of a number of wired relays only.

It is to be understood that the above described embodiments of this invention are merely illustrative of the principles thereof and that numerous other embodiments may be devised by those skilled in the art which will fall within the spirit and scope of this invention.

What is claimed and desired to be secured by Letters Patent of the United States is:

1. A dispensing system controlled by a record bearing indicia representative of articles to be dispensed comprising a plurality of article dispensing means, means including first circuit means prepared under the control of said indicia for sequentially operating a selected number of said dispensing means to select a plurality of articles in accordance with said indicia, a plurality of second circuit means representative of the cost of each of the articles, and means including third circuit means directly controlled by the indicia for sequentially selecting a number of the second circuit means to provide information relating to the cost of the articles dispensed.

2. A dispensing system controlled by a record bearing indicia representative of articles to be dispensed comprising a plurality of article dispensing means, indicia translating means responsive to the indicia for preparing first circuits in accordance with said indicia, first selector means controlled in accordance with said first circuits for actuating one of said dispensing means to dispense a selected article in accordance with said indicia, second circuit means representative of the cost of each of said articles, and second selector means responsive to said first circuits for selecting said second circuit means in accordance with the cost of said selected article.

3. A dispensing system controlled by a record bearing indicia representative of articles to be dispensed comprising a plurality of article dispensing means, first selector means for sequentially operating a selected number of said dispensing means to provide a group of articles in accordance with said indicia, second selector means for providing data representative of the cost of each article, indicia translating means responsive to said indicia for sequentially causing concurrent operation of said first and second selector means to provide dispensed articles and cost data relating thereto and recording means controlled by said cost data to provide a permanent record thereof.

4. A dispensing system controlled by a record bearing indicia representative of articles to be dispensed comprising a plurality of article dispensing devices, first translating means responsive to said indicia for preparing conductive paths in accordance therewith, selector means controlled by said paths for sequentially operating a selected group of said dispensing means to provide a group of articles in accordance with said indicia, second translating means including said prepared paths for further converting said indicia into indicia representative of the cost of the selected articles, means controlled by the second translating means in accordance with said cost indicia for totaling the cost of said selected articles, and means controlled by said totaling means for printing the total cost of said selected articles.

5. A dispensing system controlled by a record bearing indicia representing the numerical designation of an article to be dispensed comprising a plurality of groups of conductors, each of said groups representing a particular denominational group of said numerical designation, means responsive to the indicia for selecting a particular conductor in each of the groups thereof, article dispensing means, circuit means interconnecting the article dispensing means and conductor groups for operating the dispensing means in accordance with the selected conductors, and means controlled by the selection of said particular conductor in a predetermined number of said denominational groups and including less than all of said groups for energizing the selected conductors in all of the groups to operate the dispensing means.

6. A dispensing system controlled by a record bearing indicia representative of the article to be dispensed comprising circuit means for providing a plurality of conductive paths, article dispensing means connected to the circuit means, means responsive to the indicia to selectively establish a predetermined number of conductive paths in the circuit means for operating the dispensing means, and means responsive to the establishment of less than said predetermined number of conductive paths for energizing all of said predetermined number of established paths to operate the dispensing means.

7. A dispensing system controlled by a record bearing indicia representative of a plural order digital designation of the article to be dispensed comprising a plurality of article dispensing means, means controlled by said indicia for operating one of said dispensing means to dispense said article, translating means for converting the numerical designation of the article dispensed into signals representing the cost of said article, first circuit means controlled by signals representing the digits in a first group of denominational orders of the designation of the dispensed article for conditioning the translating means for operation, and second circuit means controlled by signals representing the digits in a second group of the denominational orders of said designation for energizing the conditioned translating means to provide signals representing the cost of the article dispensed.

8. A system for dispensing articles under the control of a record bearing indicia comprising an order machine movable into an operative position to initiate operation of the system, means responsive to movement to the operative position and controlled by the indicia for selecting and dispensing articles, means responsive to the indicia for totaling the cost of the articles selected, means for releasing the order machine from said operative position following the selection of the last article, and means responsive to the release of the order machine for printing the total cost of the articles.

9. A dispensing and conveying system controlled by a record bearing indicia representative of the articles to be dispensed comprising article receiving means, means responsive to the indicia for selecting and dispensing the articles to said receiving means, conveying means, means actuated following the selection of the last article for actuating the receiving means to discharge the selected articles onto the conveying means, and means controlled by the indicia and by the actuation of the receiving means for producing a visible indication of the cost of the articles selected and dispensed.

10. A dispensing and conveying system controlled by a record bearing indicia representative of the articles to be dispensed comprising article receiving means movable to a plurality of article receiving positions, means responsive to the indicia for selecting and dispensing articles to the receiving means, a plurality of conveying means, means actuated following the selection of the last article for moving the receiving means to a second article receiving position and for discharging the articles to a selected one of the conveying means, and means conjointly controlled by the indicia and the position of the receiving means for producing an indication of the total cost of the dispensed articles and the conveying means onto which the selected articles are discharged.

11. A dispensing system controlled by a record bearing article selection indicia and article quantity indicia comprising means responsive to said article indicia for sequentially dispensing articles, means normally responsive to said article indicia for totaling the number of articles dispensed in increments of one for each article dispensed, and means responsive to said quantity indicia for operating said totaling means to add an increment greater than one.

12. A dispensing system controlled by a record bearing article selection indicia and article quantity indicia comprising means responsive to said article indicia for sequentially dispensing the selected articles, means controlled by said article indicia for producing a discrete pulse in response to indicia representative of each article, means energized by said pulse producing means for totaling the number thereof, and means controlled by said quantity indicia for energizing the pulse producing means to provide a plurality of pulses representing the dispensing of a plurality of articles under the control of selection indicia representing a single article.

13. A system for selecting articles under the control of a record bearing indicia comprising indicia responsive means, a plurality of article selecting means, means controlled by the indicia responsive means for conditioning the selecting means for operation, means controlled by the conditioning means for energizing the conditioned selecting means for a predetermined period of time, and means controlled by the indicia responsive means for preventing energization of the article selecting means.

14. A system for dispensing articles under the control of a record bearing indicia comprising means responsive to said indicia, a plurality of dispensing units, means controlled by the indicia responsive means for operating a selected one of the dispensing units, and means controlled by the unit operating means for energizing said operating means for a predetermined period of time, said energizing means also being controlled by said indicia responsive means to selectively prevent energization of said unit operating means.

15. A dispensing system controlled by a record medium having article designating indicia and article quantity indicia, comprising article dispensing means, means controlled by said record medium for operating said dispensing means to dispense articles in accordance with said article designating indicia, means for indicating the number of articles dispensed, and control means controlled by said record medium for operating said indicating means to indicate the number of articles dispensed, said control means including both first means responsive to said article designating indicia for operating said indicating means to represent a single dispensed article and second means responsive to said article quantity indicia for operating said indicating means to represent more than one dispensed article.

16. The system set forth in claim 15 in which means are provided controlled by said second means for preventing said first means from operating said indicating means when said second means is operated.

17. A system for dispensing articles under the control of indicia on a record medium, comprising article dispensing means controlled by said record medium for selecting and dispensing a plurality of articles in accordance with said indicia, cost totaling means controlled by said record medium for establishing a plural order designation of the total cost of the dispensed articles, recording means including a plurality of individually adjustable recording elements, means operated at the completion of the dispensing of said plurality of articles for rendering said totaling means effective to individually adjust each of said recording elements to a position representing one digit of said total cost, control means individual to each of said recording elements and operable when the associated recording element is adjusted to a position representing the corresponding digit of the total cost, and means including all of said control means and operated by the operation of all of said control means for actuating said recording means to record said total cost.

18. A dispensing and conveying system using a sensible medium having article representing indicia thereon, comprising article dispensing means controlled by said sensible medium for dispensing articles in accordance with said indicia, a pair of indicating means controlled by said sensible medium for providing an indication of the cost of the articles dispensed by said article dispensing means, a pair of conveying means each adapted to receive the dispensed articles, and means connected to said pair of indicating means for rendering a selected one of said indicating means effective to provide an indication of the cost of the articles dispensed in accordance with the one of the conveying means on which the dispensed articles have been received.

References Cited in the file of this patent

UNITED STATES PATENTS

| | | |
|---|---|---|
| 2,374,537 | Goldsmith | Apr. 24, 1945 |
| 2,416,870 | Farmer | Mar. 4, 1947 |
| 2,597,538 | Skillman et al. | May 20, 1952 |
| 2,599,906 | Farmer | June 10, 1952 |
| 2,608,348 | Law | Aug. 26, 1952 |
| 2,611,540 | Law | Sept. 23, 1952 |
| 2,661,682 | Saunders | Dec. 8, 1953 |
| 2,679,354 | Skillman | May 25, 1954 |

OTHER REFERENCES

"Auto-Serv A New Wrinkle in Self Service Markets," a publication received in the Patent Office, Sept. 4, 1943.

"Push-Button Grocery," New York Sunday News, November 1948; Magazine Section, pages 2 and 4.